US009426489B2

(12) United States Patent
Shimada et al.

(10) Patent No.: US 9,426,489 B2
(45) Date of Patent: Aug. 23, 2016

(54) VIDEO DECODING APPARATUS, VIDEO CODING APPARATUS, VIDEO DECODING METHOD, VIDEO CODING METHOD, AND STORAGE MEDIUM

(71) Applicant: FUJITSU LIMITED, Kawasaki-shi, Kanagawa (JP)

(72) Inventors: Satoshi Shimada, Kawasaki (JP); Akira Nakagawa, Sagamihara (JP); Kimihiko Kazui, Kawasaki (JP); Junpei Koyama, Shibuya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/657,778

(22) Filed: Mar. 13, 2015

(65) Prior Publication Data

US 2015/0189313 A1    Jul. 2, 2015

Related U.S. Application Data

(63) Continuation of application No. 13/480,304, filed on May 24, 2012, now Pat. No. 9,247,267.

(30) Foreign Application Priority Data

Jun. 15, 2011 (JP) ................................. 2011-133383

(51) Int. Cl.
*H04N 11/02* (2006.01)
*H04N 19/52* (2014.01)
(Continued)

(52) U.S. Cl.
CPC ............. *H04N 19/52* (2014.11); *H04N 19/103* (2014.11); *H04N 19/105* (2014.11);
(Continued)

(58) Field of Classification Search
CPC ..................................................... H04N 19/521
USPC ....................................... 375/240.01–240.29
See application file for complete search history.

(56) References Cited

U.S. PATENT DOCUMENTS

| 6,363,128 B1 | 3/2002 | Isaksson et al. |
| 7,656,953 B1 | 2/2010 | Haskell et al. |

(Continued)

FOREIGN PATENT DOCUMENTS

| CN | 101631241 | 1/2010 |
| EP | 1369820 | 12/2003 |

(Continued)

OTHER PUBLICATIONS

Canadian Office Action dated Jul. 13, 2015 in Canadian Patent Application No. 2,778,486.

(Continued)

*Primary Examiner* — Leron Beck
(74) *Attorney, Agent, or Firm* — Staas & Halsey LLP

(57) ABSTRACT

A video decoding apparatus includes a reference picture list storing unit configured to store picture information of pictures; a motion vector information storing unit configured to store motion vector information including motion vectors of blocks that are spatially and temporally adjacent to a target block to be decoded and reference picture identifiers indicating pictures that the motion vectors refer to; and a vector predictor generating unit configured to scale a vector predictor candidate for a motion vector of the target block based on the picture information and the motion vector information and to correct the scaled vector predictor candidate toward 0 by a predetermined amount.

1 Claim, 26 Drawing Sheets

(51) Int. Cl.
| | |
|---|---|
| H04N 19/105 | (2014.01) |
| H04N 19/503 | (2014.01) |
| H04N 19/176 | (2014.01) |
| H04N 19/51 | (2014.01) |
| H04N 19/103 | (2014.01) |
| H04N 19/587 | (2014.01) |
| H04N 19/577 | (2014.01) |
| H04N 19/513 | (2014.01) |
| H04N 19/31 | (2014.01) |
| H04N 19/33 | (2014.01) |
| H04N 19/543 | (2014.01) |

(52) U.S. Cl.
CPC ............ *H04N 19/176* (2014.11); *H04N 19/31* (2014.11); *H04N 19/33* (2014.11); *H04N 19/503* (2014.11); *H04N 19/51* (2014.11); *H04N 19/521* (2014.11); *H04N 19/543* (2014.11); *H04N 19/577* (2014.11); *H04N 19/587* (2014.11)

(56) References Cited

U.S. PATENT DOCUMENTS

| | | |
|---|---|---|
| 2001/0021272 A1 | 9/2001 | Yamori et al. |
| 2005/0117646 A1 | 6/2005 | Joch et al. |
| 2005/0190774 A1 | 9/2005 | Wiegand |
| 2006/0245497 A1 | 11/2006 | Tourapis et al. |
| 2008/0247462 A1 | 10/2008 | Demos |
| 2009/0196515 A1 | 8/2009 | Kim et al. |
| 2011/0164684 A1 | 7/2011 | Sato et al. |

FOREIGN PATENT DOCUMENTS

| | | |
|---|---|---|
| EP | 1482742 | 12/2004 |
| EP | 1796041 | 6/2007 |
| JP | 2004-208258 | 7/2004 |
| TW | 201010442 A1 | 3/2010 |
| TW | 201106704 | 2/2011 |
| WO | 2009/126937 A1 | 10/2009 |
| WO | WO 2010/035733 | 4/2010 |

OTHER PUBLICATIONS

Espacenet English Abstract of Chinese Publication No. 101631241, published Jan. 20, 2010.
International Telecommunication Union, ITU-T, Telecommunication Standarization Sector of IT, "*Advanced video coding for generic audiovisual services*", Recommendation ITU-T H.264 (Mar. 2010).
Thomas Wiegand et al., ISO, IEC, Joint Collaborative Team on Video Coding (JCT-VC) of ITU-T SG16 WP3 and ISO/IEC JTC1/SC29/WG11, "*WD3: Working Draft 3 of High-Efficiency Video Coding*", HEVC, Document JCTVC-E603, 5$^{th}$ Meeting: Geneva, CH, Mar. 16-23, 2011.
Australian Patent Office Action dated Aug. 12, 2013 in Application No. 2012203337.
Chinese Office Action mailed Jun. 23, 2014 in corresponding Chinese Patent Application No. 201210174055.5.
Canadian Office Action mailed Aug. 11, 2014 in corresponding Canadian Patent Application No. 2,778,486.
U.S. Office Action mailed Dec. 18, 2014 in corresponding U.S. Appl. No. 13/480,304.
U.S. Appl. No. 13/480,304, filed May 24, 2012, Satoshi Shimada et al., Fujitsu Limited.
U.S. Appl. No. 14/657,747, filed Mar. 13, 2015, Shimada et al., Fujitsu Limited.
U.S. Appl. No. 14/657,766, filed Mar. 13, 2015, Shimada et al., Fujitsu Limited.
Taiwanese Office Action mailed on Feb. 25, 2015 in Taiwanese Application No. 101118949.
U.S. Office Action mailed Apr. 10, 2015 in U.S. Appl. No. 13/480,304.
U.S. Office Action mailed Feb. 12, 2016 in U.S. Appl. No. 14/857,078.
Espacenet English Abstract of Taiwanese Publication No. 201106704, published Feb. 16, 2011.
Patent Abstracts of Japan, Publication No. 2004-208258, published Jul. 22, 2004.
"Text of ISO/IEC 14496-10 FCD Advanced Video Coding", 61. MPEG Meeting; Jul. 22, 2002-Jul. 26, 2002; Klagenfurt; (Motion Picture Expert Group or ISO/IEC JTC1/SC29/WG11), No. N4920, Aug. 11, 2002, XP030012343, ISSN: 0000-0365, pp. i-xvi, 1-191, paragraph [3.79] —paragraph [3.86], paragraph [10.3.2], paragraph [10.3.3], paragraph [10.3.3.1], paragraph [10.3.3.2], figures 10-1-10-7**.
Jeon et al: "B pictures in JVT," [entitled "B Picture Design Output Document" in the attached European Search Report] 4$^{th}$ JVT Meeting; 61. MPEG Meeting; Jul. 22, 2002-Jul. 26, 2002; Klagenfurt, AT; (Joint Video Team of ISO/IEC JTC1/SC29/WG11 and ITU-T SG.16), No. JVT-D155, Jul. 26, 2002, XP030005418, ISSN: 0000-0439, Nineteen pages, paragraph [11.3], paragraph [11.4.3.1] — paragraph [11.4.3,2], figures 11-3-11-8**.
Li S. et al: "Direct Mode Coding for Bipredictive Slices in the H.264 Standard", IEEE Transactions on Circuits and Systems for Video Technology, IEEE Service Center, Piscataway, NJ, US, vol. 15, No. 1, Jan. 1, 2005, pp. 119-126, XP011124673, ISSN: 1051-8215, DOI: 10.1109/TCSVT.2004.837021, paragraph [0001] —paragraph [0011], figures 1-5**.
Jeon: "Direct mode in B pictures", 4. JVT Meeting; 61. MPEG Meeting; Jul. 22, 2002-Jul. 26, 2002; Klagenfurt,AT; (Joint Video Team of ISo/IEC JTC1/SC29/WG11 and ITU-T SG.16), No. JVT-D056, Jul. 26, 2002, XP030005330, ISSN: 0000-0441, pp. 1-10, paragraph [02.1]**.
Kazui K. et al: "Improvement on simplified motion vector prediction", Mar. 10, 2011, No. JCTVC-E062, Mar. 10, 2011, XP030008568, ISSN: 0000-0007, pp. 1-9, figures 1-5, paragraph [0001] —paragraph [0002]**.
Extended European Search Report dated Apr. 12, 2016 in corresponding European Patent Application No. 12169078.8.
Espacenet English Abstract of Taiwanese Publication No. 201010442 A1, Published Mar. 1, 2010.
Taiwanese Office Action dated Mar. 11, 2016 in corresponding Taiwanese Patent Application 104125096.
U.S. Office Action for U.S. Appl. No. 14/857,078, issued on Jun. 17, 2016.

U.S. 9,426,489 B2

VIDEO DECODING APPARATUS, VIDEO CODING APPARATUS, VIDEO DECODING METHOD, VIDEO CODING METHOD, AND STORAGE MEDIUM

CROSS-REFERENCE TO RELATED APPLICATION

This application is based upon and claims the benefit of priority under 35 U.S.C. §119 of the prior Japanese Patent Application No. 2011-133383 filed on Jun. 15, 2011, and is a continuation application filed under USC §§111 and 120 of U.S. Ser. No. 13/480,304, filed May 24, 2012, the entire contents of which are incorporated herein by reference.

FIELD

The embodiments discussed herein are related to a video decoding apparatus, a video coding apparatus, a video decoding method, a video coding method, and a storage medium.

BACKGROUND

In recent video coding techniques, a picture is divided into blocks, pixels in the blocks are predicted, and predicted differences are encoded to achieve a high compression ratio. A prediction mode where pixels are predicted from spatially neighboring pixels in a picture to be encoded is called an intra prediction mode. Meanwhile, a prediction mode where pixels are predicted from a previously-encoded reference picture using a motion compensation technique is called an inter prediction mode.

In the inter prediction mode of a video coding apparatus, a reference region used to predict pixels is represented by two-dimensional coordinate data called a motion vector that includes a horizontal component and a vertical component, and motion vector data and difference pixel data between original pixels and predicted pixels are encoded. To reduce the amount of code, a vector predictor is generated based on a motion vector of a block that is adjacent to a target block to be encoded (may be referred to as an encoding target block), and a difference vector between a motion vector of the target block and the vector predictor is encoded. By assigning a smaller amount of code to a smaller difference vector, it is possible to reduce the amount of code for the motion vector and to improve the coding efficiency.

Meanwhile, in a video decoding apparatus, a vector predictor that is the same as the vector predictor generated in the video coding apparatus is determined for each block, and the motion vector is restored by adding the encoded difference vector and the vector predictor. For this reason, the video coding apparatus and the video decoding apparatus include vector prediction units having substantially the same configuration.

In the video decoding apparatus, blocks are decoded, generally, from the upper left to the lower right in the order of the raster scan technique or the z scan technique. Therefore, only a motion vector of a block that is to the left or above a target block to be decoded at the video decoding apparatus, i.e., a motion vector that is decoded before the target block, can be used for prediction by the motion vector prediction units of the video coding apparatus and the video decoding apparatus.

Meanwhile, in MPEG (Moving Picture Experts Group)-4 AVC/H.264 (hereafter may be simply referred to as H.264), a vector predictor may be determined using a motion vector of a previously encoded/decoded reference picture instead of a motion vector of a target picture to be processed (see, for example, ISO/IEC 14496-10 (MPEG-4 Part 10)/ITU-T Rec. H.264).

Also, a method of determining a vector predictor is disclosed in "WD3: Working Draft 3 of High-Efficiency Video Coding" JCTVC-E603, JCT-VC 5th Meeting, March 2011. High-Efficiency Video Coding (HEVC) is a video coding technology the standardization of which is being jointly discussed by ISO/IEC and ITU-T. HEVC Test Model (HM) software (version 3.0) has been proposed as reference software.

The outline of HEVC is described below. In HEVC, reference picture lists L0 and L1 listing reference pictures are provided. For each block, regions of up to two reference pictures, i.e., motion vectors corresponding to the reference picture lists L0 and L1, can be used for inter prediction.

The reference picture lists L0 and L1 correspond, generally, to directions of display time.

The reference picture list L0 lists previous pictures with respect to a target picture to be processed, and the reference picture list L1 lists future pictures. Each entry of the reference picture lists L0 and L1 includes a storage location of pixel data and a picture order count (POC) of the corresponding picture.

POCs are represented by integers, and indicate the order in which pictures are displayed and relative display time of the pictures. Assuming that a picture with a POC "0" is displayed at display time "0", the display time of a given picture can be obtained by multiplying the POC of the picture by a constant. For example, when "fr" indicates the display cycle (Hz) of frames and "p" indicates the POC of a picture, the display time of the picture may be represented by formula (1) below.

$$\text{Display time} = p \times (fr/2) \qquad \text{formula (1)}$$

Accordingly, it can be said that the POC indicates display time of a picture in units of a constant.

When a reference picture list includes two or more entries, reference pictures that motion vectors refer to are specified by index numbers (reference indexes) in the reference picture list. When a reference picture list includes only one entry (or one picture), the reference index of a motion vector corresponding to the reference picture list is automatically set at "0". In this case, there is no need to explicitly specify the reference index.

A motion vector of a block includes an L0/L1 list identifier, a reference index, and vector data (Vx, Vy). A reference picture is identified by the L0/L1 list identifier and the reference index, and a region in the reference picture is identified by the vector data (Vx, Vy). Vx and Vy in the vector data indicate, respectively, differences between the coordinates of a reference region in the horizontal and vertical axes and the coordinates of a target block (or current block) to be processed. For example, Vx and Vy may be represented in units of quarter pixels. The L0/L1 list identifier and the reference index may be collectively called a reference picture identifier, and (0, 0) may be called a 0 vector.

A method of determining a vector predictor in HEVC is described below. A vector predictor is determined for each reference picture identified by the L0/L1 list identifier and the reference index. In determining vector data mvp of a vector predictor for a motion vector referring to a reference picture identified by a list identifier LX and a reference index refidx, up to three sets of vector data are calculated as vector predictor candidates.

Blocks that are spatially and temporally adjacent to a target block are categorized into three groups: blocks to the left of the target block (left group), blocks above the target block (upper group), and blocks temporally adjacent to the target block (temporally-adjacent group). From each of the three groups, up to one vector predictor candidate is selected.

Selected vector predictor candidates are listed in the order of priority of the groups: the temporally-adjacent group, the left group, and the upper group. This list is placed in an array mvp_cand. If no vector predictor candidate is present in all the groups, a 0 vector is added to the array mvp_cand.

A predictor candidate index mvp_idx is used to identify one of the vector predictor candidates in the list which is to be used as the vector predictor. That is, the vector data of a vector predictor candidate located at the "mvp_idx"-th position in the array mvp_cand are used as the vector data mvp of the vector predictor.

When my indicates a motion vector of an encoding target block which refers to a reference picture identified by the list identifier LX and the reference index refidx, the video coding apparatus searches the array mvp_cand to find a vector predictor candidate closest to the motion vector mv, and sets the index of the found vector predictor candidate as the predictor candidate index mvp_idx. Also, the video coding apparatus calculates a difference vector mvd using formula (2) below and encodes refidx, mvd, and mvp_idex as motion vector information for the list LX.

$$mvd = mv - mvp \quad \text{formula (2)}$$

The video decoding apparatus decodes refidx, mvd, and mvp_idex, determines mvp_cand based on refidx, and uses the vector predictor candidate located at the "mvp_idx"-th position in mvp_cand as the vector predictor mvp. The video decoding apparatus restores the motion vector my of the target block based on formula (3) below.

$$mv = mvd + mvp \quad \text{formula (3)}$$

Next, blocks spatially adjacent to a target block are described. FIG. 1 is a drawing illustrating blocks spatially adjacent to a target block. With reference to FIG. 1, exemplary processes of selecting vector predictor candidates from blocks to the left of the target block and blocks above the target block are described.

First, an exemplary process of selecting a vector predictor candidate from the blocks to the left of the target block is described. Blocks I and H to the left of the target block are searched in this order until a motion vector 1 with the list identifier LX and the reference index refidx is found. If the motion vector 1 with the list identifier LX and the reference index refidx is found, the motion vector 1 is selected.

If the motion vector 1 is not found, a motion vector 2, which refers to a reference picture that is in a reference picture list LY and is the same as the reference picture indicated by the reference index refidx of the reference picture list LX, is searched for. If the motion vector 2 is found, the motion vector 2 is selected.

If the motion vector 2 is not found, a motion vector 3 for inter prediction is searched for. If the motion vector 3 is found, the motion vector 3 is selected. If the motion vector selected in this process does not refer to a reference picture that is the same as the reference picture indicated by the reference index refidx of the reference picture list LX, a scaling process described later is performed.

Next, an exemplary process of selecting a vector predictor candidate from the blocks above the target block is described. Blocks E, D, and A above the target block are searched in this order until a motion vector 1 with the list identifier LX and the reference index refidx is found. If the motion vector 1 with the list identifier LX and the reference index refidx is found, the motion vector 1 is selected.

If the motion vector 1 is not found, a motion vector 2, which refers to a reference picture that is in a reference picture list LY and is the same as the reference picture indicated by the reference index refidx of the reference picture list LX, is searched for. If the motion vector 2 is found, the motion vector 2 is selected.

If the motion vector 2 is not found, a motion vector 3 for inter prediction is searched for. If the motion vector 3 is found, the motion vector 3 is selected. If the motion vector selected in this process does not refer to a reference picture that is the same as the reference picture indicated by the reference index refidx of the reference picture list LX, a scaling process described later is performed.

Next, blocks temporally adjacent to a target block are described. FIG. 2 is a drawing used to describe a process of selecting a vector predictor candidate from blocks temporally adjacent to a target block.

First, a temporally-adjacent reference picture 20, which includes a temporally-adjacent block and is called a collocated picture (ColPic), is selected. The ColPic 20 is a reference picture with reference index "0" in the reference picture list L0 or L1. Normally, a ColPic is a reference picture with reference index "0" in the reference picture list L1.

An mvCol 22, which is a motion vector of a block (Col block) 21 located in the ColPic 20 at the same position as a target block 11, is scaled by a scaling method described below to generate a vector predictor candidate.

An exemplary method of scaling a motion vector is described below. Here, it is assumed that an input motion vector is represented by mvc=(mvcx, mvcy), an output vector (vector predictor candidate) is represented by mvc'=(mvcx', mvcy'), and mvc is mvCol.

Also, ColRefPic 23 indicates a picture that mvc refers to, ColPicPoc indicates the POC of the ColPic 20 including mvc, ColRefPoc indicates the POC of the ColRefPic 23, CurrPoc indicates the POC of a current target picture 10, and CurrRefPoc indicates the POC of a picture 25 identified by RefPicList_LX and RefIdx.

When the motion vector to be scaled is a motion vector of a spatially-adjacent block, ColPicPoc equals CurrPoc. When the motion vector to be scaled is a motion vector of a temporally-adjacent block, ColPicPoc equals the POC of ColPic.

As indicated by formulas (4) and (5) below, mvc is scaled based on the ratio between time intervals of pictures.

$$mvcx' = mvcx \times (\text{CurrPoc} - \text{CurrRefPoc})/(\text{ColPicPoc} - \text{ColRefPoc}) \quad \text{formula (4)}$$

$$mvcy' = mvcy \times (\text{CurrPoc} - \text{CurrRefPoc})/(\text{ColPicPoc} - \text{ColRefPoc}) \quad \text{formula (5)}$$

However, since division requires a large amount of calculation, mvc' may be approximated, for example, by multiplication and shift using formulas below.

$$\text{DiffPocD} = \text{ColPicPoc} - \text{ColRefPoc} \quad \text{formula (6)}$$

$$\text{DiffPocB} = \text{CurrPoc} - \text{CurrRefPoc} \quad \text{formula (7)}$$

$$TDB = \text{Clip3}(-128, 127, \text{DiffPocB}) \quad \text{formula (8)}$$

$$TDD = \text{Clip3}(-128, 127, \text{DiffPocD}) \quad \text{formula (9)}$$

$$iX = (0\text{x}4000 + \text{abs}(TDD/2))/TDD \quad \text{formula (10)}$$

$$\text{Scale} = \text{Clip3}(-1024, 1023, (TDB \times iX + 32) >> 6) \quad \text{formula (11)}$$

abs ( ): a function that returns an absolute value

Clip3(x, y, z): a function that returns a median of x, y, and z

>>: right arithmetic shift

"Scale" obtained by formula (11) is used as a scaling factor. In this example, Scale=256 indicates a coefficient of "1", i.e., my is not scaled. The scaling factor has an 8-bit precision after the decimal point.

Accordingly, when multiplied by the scaling factor, the precision after the decimal point of a motion vector is increased by 8 bits.

Based on the scaling factor Scale, a scaling operation is performed using the formulas below.

$$mvcx' = (Scale \times mvcx + 128) >> 8 \quad \text{formula (12)}$$

$$mvcy' = (Scale \times mvcy + 128) >> 8 \quad \text{formula (13)}$$

In formulas (12) and (13), N bits after the decimal point are rounded off to the nearest integer by adding 2N−1 to a value multiplied by the scaling factor and shifting the result of addition to the right by N bits. A similar scaling process is disclosed in ISO/IEC 14496-10 (MPEG-4 Part 10)/ITU-T Rec. H.264. The obtained vector mvc' is used as a vector predictor candidate.

SUMMARY

According to an aspect of this disclosure, there is provided a video decoding apparatus that includes a reference picture list storing unit configured to store picture information of pictures; a motion vector information storing unit configured to store motion vector information including motion vectors of blocks that are spatially and temporally adjacent to a target block to be decoded and reference picture identifiers indicating pictures that the motion vectors refer to; and a vector predictor generating unit configured to scale a vector predictor candidate for a motion vector of the target block based on the picture information and the motion vector information and to correct the scaled vector predictor candidate toward 0 by a predetermined amount.

The object and advantages of the invention will be realized and attained by means of the elements and combinations particularly pointed out in the claims.

It is to be understood that both the foregoing general description and the followed detailed description are exemplary and explanatory and are not restrictive of the invention as claimed.

DESCRIPTION OF EMBODIMENTS

In HEVC and H.264, movement between frames is represented by motion vectors of respective blocks. Generally, when generating a vector predictor from a temporally-adjacent block, the motion vector of the temporally-adjacent block is scaled. Here, a difference T1 between the display time of a target picture and the display time of a picture that the motion vector of a target block refers to is different from a difference T2 between the display time of a picture including a temporally-adjacent block and the display time of a picture that the motion vector of the temporally-adjacent block refers to.

Therefore, the motion vector of the temporally-adjacent block is scaled by the ratio between the difference T1 and the difference T2 (T1/T2) so that the amount of movement per unit time becomes constant. However, with a method as indicated by formulas (12) and (13) where the motion vector is scaled using a scaling factor having a certain precision after the decimal point and a vector predictor is represented by integers nearest to the scaled motion vector, it is difficult to improve the accuracy of the vector predictor.

An aspect of this disclosure makes it possible to improve the accuracy of a vector predictor.

Figure 1:
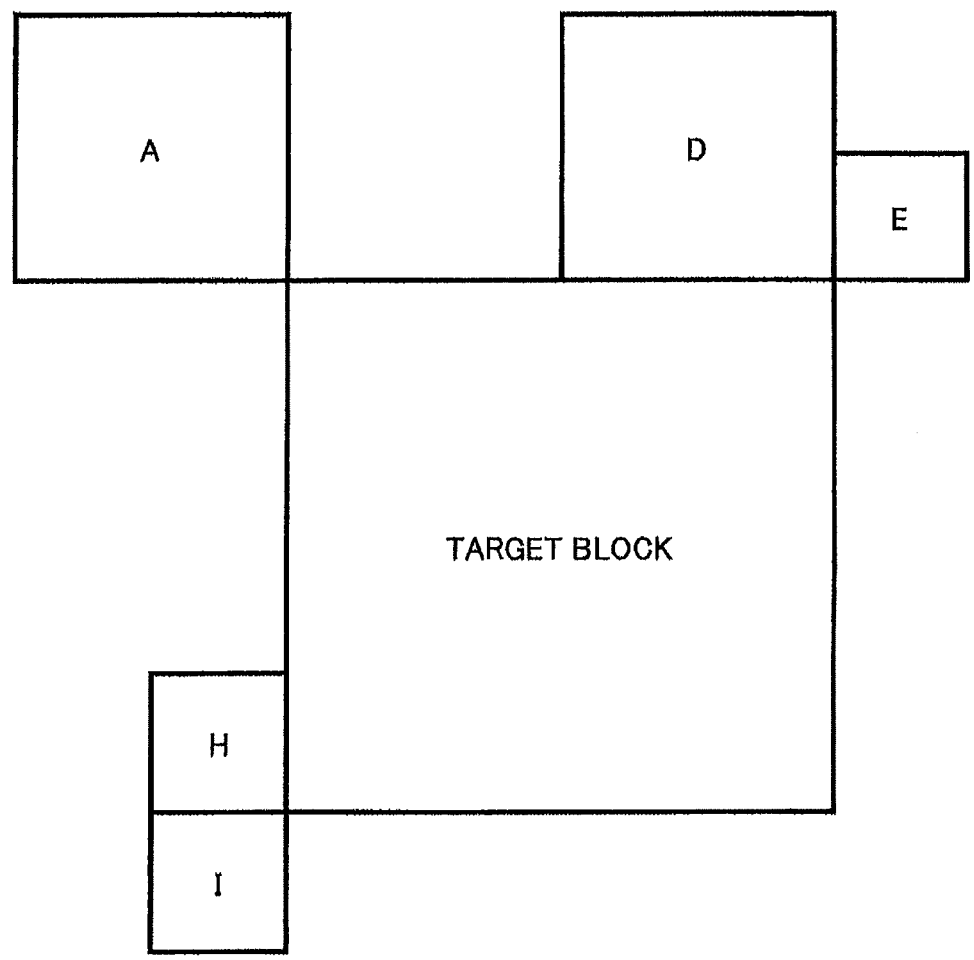
FIG. 1 is a drawing illustrating blocks spatially adjacent to a target block.
Figure 2:
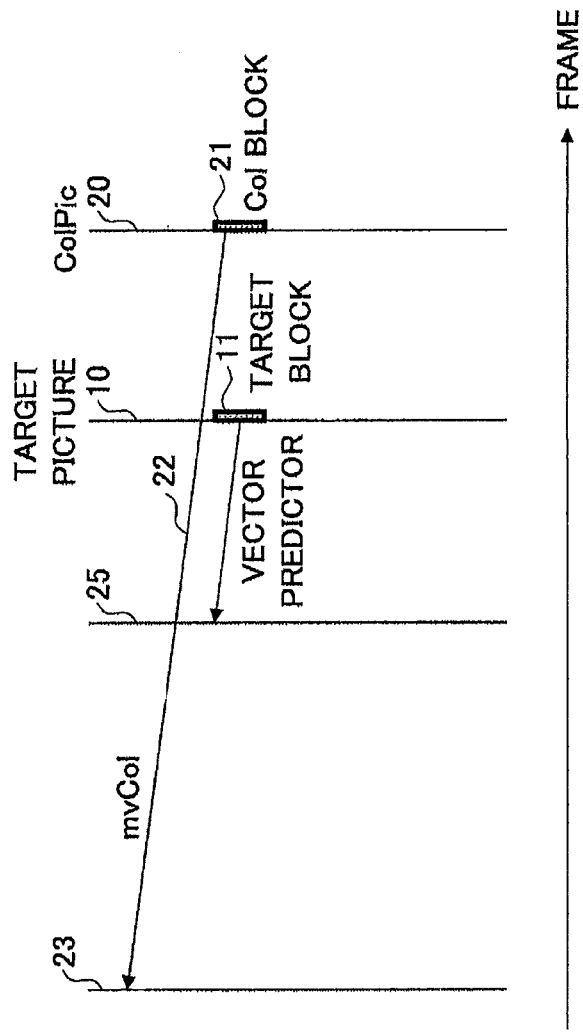
FIG. 2 is a drawing used to describe a process of selecting a vector predictor candidate from a block temporally adjacent to a target block.
Figure 3:
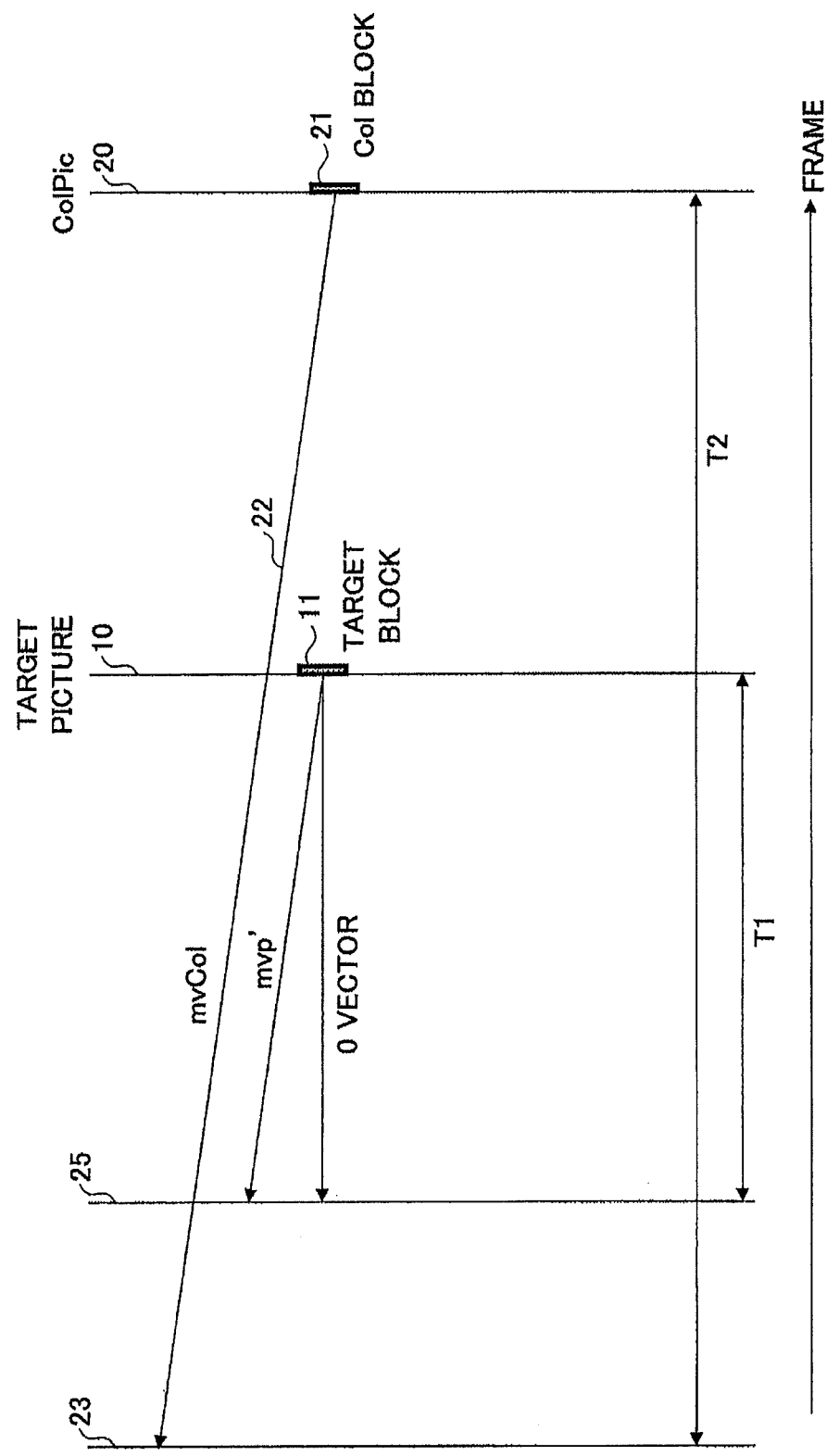
FIG. 3 is a drawing illustrating a relationship between mvp' and mvCol.

The inventors studied the accuracy of vector predictors. FIG. 3 is a drawing illustrating a relationship between mvp' and mvCol. In FIG. 3, mvCol 22 indicates a motion vector of a block (Col block 21) that is temporally adjacent to a target block 11 to be processed, and mv indicates a motion vector of the target block 11.

Also in FIG. 3, mvp' indicates a motion vector (vector predictor candidate) obtained by scaling the mvCol 22 by the ratio (T1/T2) described above with infinite precision of real numbers. That is, mvp' is represented by formula (14) below.

$$mvp'=mvCol\times(T1/T2) \qquad \text{formula (14)}$$

When a vector predictor candidate that equals mv is selected as the vector predictor, the difference vector becomes "0" and as a result, the coding efficiency is improved. Therefore, it is important to make mvp' become equal or close to mv in order to improve the coding efficiency. The inventors studied differences between mvp' and mv.

Figure 4:
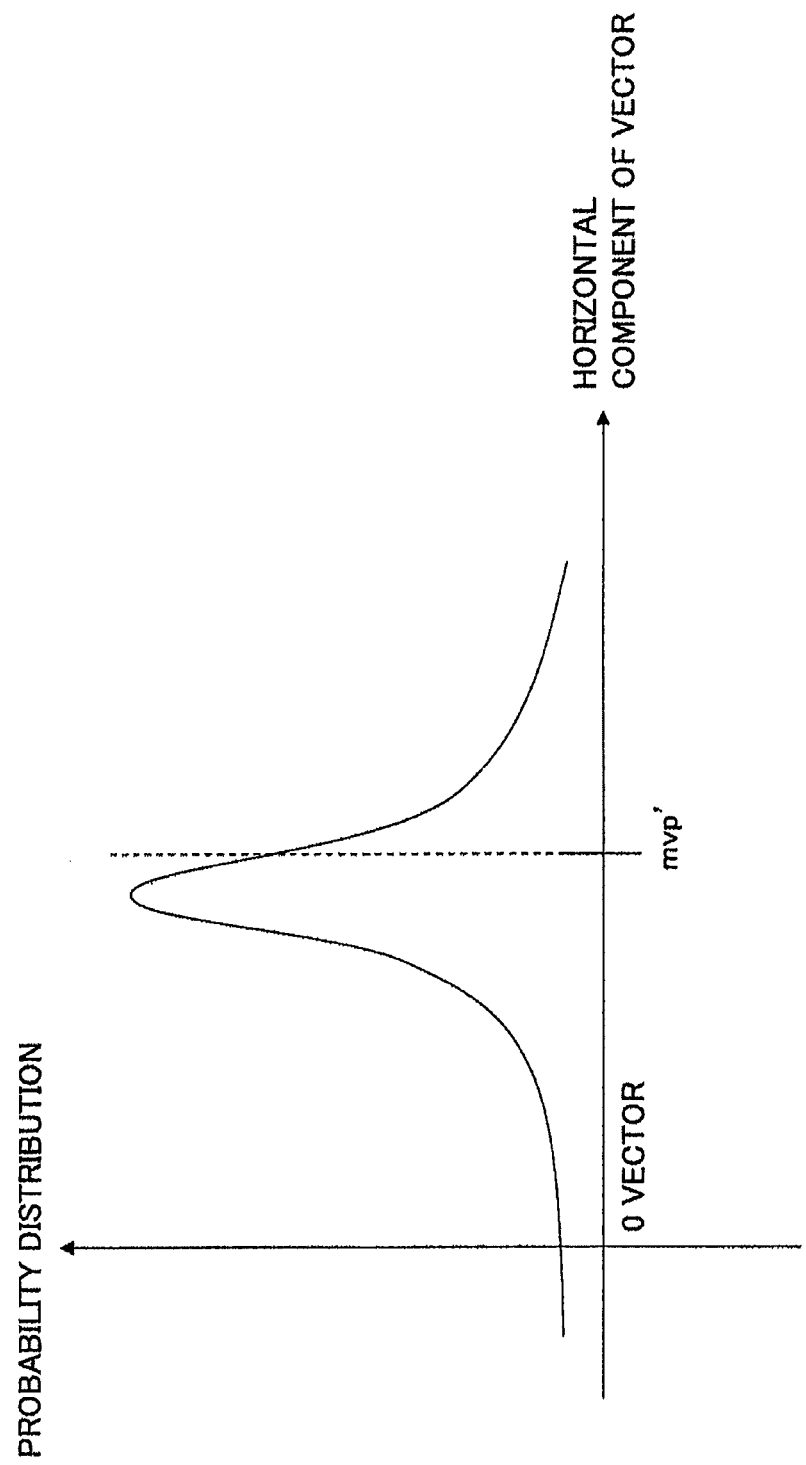
FIG. 4 is a graph illustrating an appearance probability distribution of my when mvp' is positive.
Figure 5:
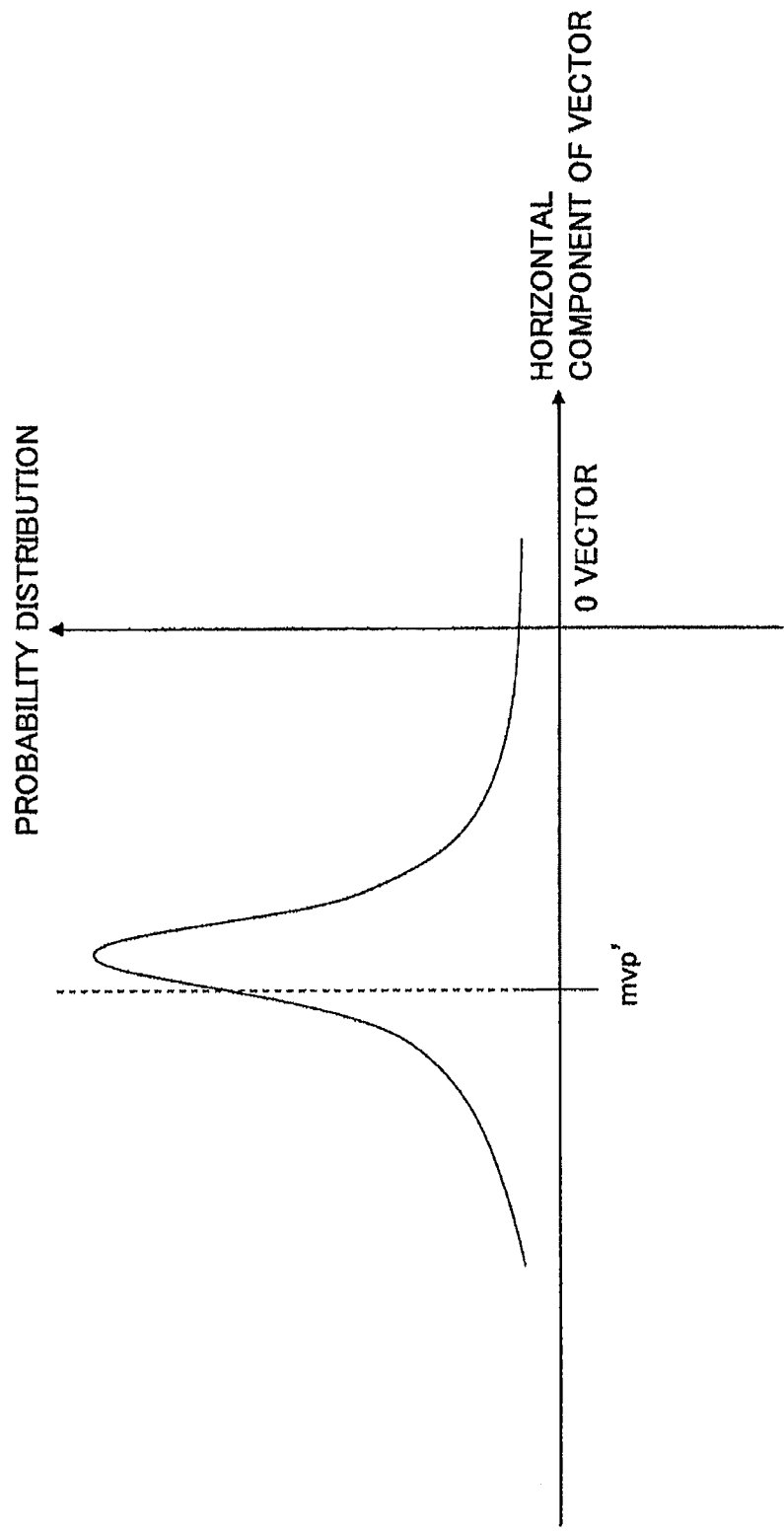
FIG. 5 is a graph illustrating an appearance probability distribution of my when mvp' is negative.

FIG. 4 is a graph illustrating an appearance probability distribution of mv when mvp' is positive. The probability distribution of FIG. 4 is based on the horizontal components of vectors. FIG. 5 is a graph illustrating an appearance probability distribution of mv when mvp' is negative. The probability distribution of FIG. 5 is also based on the horizontal components of vectors.

When mvp' obtained by scaling the mvCol 22 is compared with mv, as illustrated in FIGS. 4 and 5, the frequency of appearance of mv is highest at a point slightly closer than mvp' to the 0 vector. For this reason, in the embodiments described below, a vector predictor candidate scaled by a scaling factor is corrected toward the 0 vector.

Preferred embodiments of the present invention are described below with reference to the accompanying drawings.

<<First Embodiment<<

<Configuration>

Figure 6:
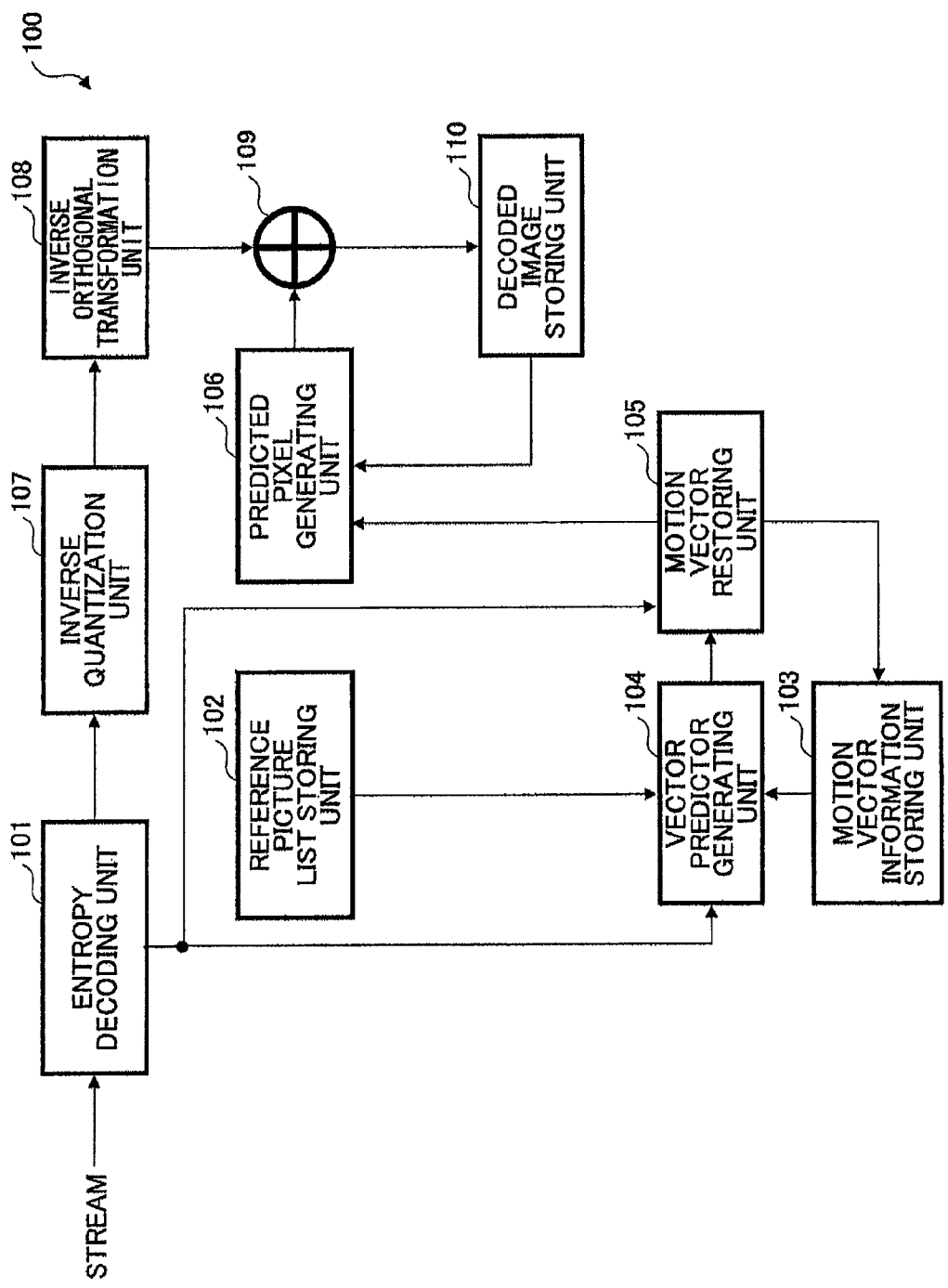
FIG. 6 is a block diagram illustrating an exemplary configuration of a video decoding apparatus according to a first embodiment.

FIG. 6 is a block diagram illustrating an exemplary configuration of a video decoding apparatus 100 according to a first embodiment. As illustrated in FIG. 6, the video decoding apparatus 100 may include an entropy decoding unit 101, a reference picture list storing unit 102, a motion vector information storing unit 103, a vector predictor generating unit 104, a motion vector restoring unit 105, a predicted pixel generating unit 106, an inverse quantization unit 107, an inverse orthogonal transformation unit 108, a decoded pixel generating unit 109, and a decoded image storing unit 110.

The entropy decoding unit 101 performs entropy decoding on a compressed stream, and thereby decodes reference indexes, difference vectors, and predictor candidate indexes for L0 and L1 of a target block, and an orthogonal transformation coefficient.

The reference picture list storing unit 102 stores picture information that includes POCs of pictures including reference pictures that a target block can refer to, and also stores storage locations of image data.

The motion vector information storing unit 103 stores motion vector information including motion vectors of blocks that are temporally and spatially adjacent to a target block and reference picture identifiers indicating pictures that the motion vectors refer to. The motion vector information is generated by the motion vector restoring unit 105.

The vector predictor generating unit 104 obtains the reference indexes (reference picture identifiers) of L0 and L1 from the entropy decoding unit 101, and generates lists of vector predictor candidates for a motion vector of the target block. Details of the vector predictor generating unit 104 are described later.

The motion vector restoring unit 105 obtains the predictor candidate indexes and the difference vectors for L0 and L1 from the entropy decoding unit 101, and adds vector predictor candidates indicated by the predictor candidate indexes to the corresponding difference vectors to restore motion vectors.

The predicted pixel generating unit 106 generates a predicted pixel signal using the restored motion vectors and a decoded image stored in the decoded image storing unit 110.

The inverse quantization unit 107 performs inverse quantization on the orthogonal transformation coefficient obtained from the entropy decoding unit 101. The inverse orthogonal transformation unit 108 generates a prediction error signal by performing inverse orthogonal transformation on an inversely-quantized signal output from the inverse quantization unit 107. The prediction error signal is output to the decoded pixel generating unit 109.

The decoded pixel generating unit 109 adds the predicted pixel signal and the prediction error signal to generate decoded pixels.

The decoded image storing unit 110 stores a decoded image including the decoded pixels generated by the decoded pixel generating unit 109. The decoded image stored in the decoded image storing unit 110 is output to a display unit.

Figure 7:
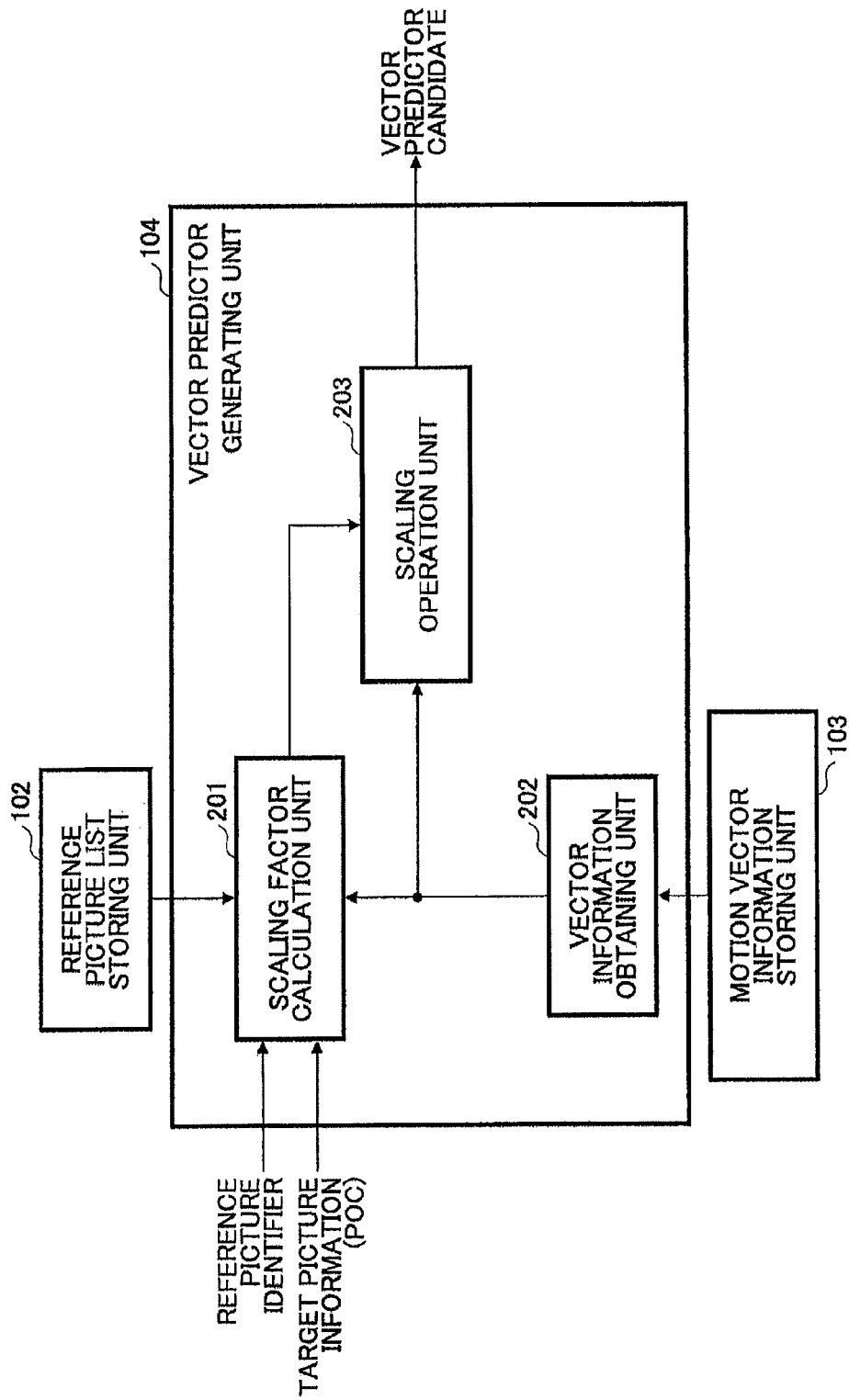
FIG. 7 is a block diagram illustrating an exemplary configuration of a vector predictor generating unit according to the first embodiment.

Next, the vector predictor generating unit 104 is described in more detail. FIG. 7 is a block diagram illustrating an exemplary configuration of the vector predictor generating unit 104 according to the first embodiment. As illustrated in FIG. 7, the vector predictor generating unit 104 may include a scaling factor calculation unit 201, a vector information obtaining unit 202, and a scaling operation unit 203.

The vector predictor generating unit 104 receives a reference picture identifier of a target block and POC information of a target picture. Here, LX indicates a reference list identifier and refidx indicates a reference index included in the reference picture identifier of the target block.

The motion vector information storing unit 103 stores motion vector information for previously-processed blocks. The motion vector information of a motion vector includes an identifier of a picture to which a block including the motion vector belongs, an identifier (reference picture identifier) of a picture that the motion vector refers to, and values of horizontal and vertical components of the motion vector.

The vector information obtaining unit 202 obtains motion vector information of a block that is adjacent to a target block from the motion vector information storing unit 103. The motion vector information includes a motion vector, an identifier of a picture to which the block including the motion vector belongs, and a reference picture identifier of a reference picture that the motion vector refers to.

The vector information obtaining unit 202 sequentially obtains motion vector information of blocks that are spatially and temporally adjacent to a target block. As described above, a motion vector of a block to the left of the target block is first searched for. The vector information obtaining unit 202 searches for a motion vector 1 with the list identifier LX and the reference index refidx, and selects the motion vector 1 if it is found.

If the motion vector 1 is not found, the vector information obtaining unit 202 searches for a motion vector 2 referring to a reference picture that is in a reference picture list LY and is the same as the reference picture indicated by the reference index refidx of the reference picture list LX. If the motion vector 2 is found, the vector information obtaining unit 202 selects the motion vector 2.

If the motion vector 2 is not found, the vector information obtaining unit 202 searches for a motion vector 3 for inter prediction. If the motion vector 3 is found, the vector information obtaining unit 202 selects the motion vector 3. If the motion vector selected in this process does not refer to a reference picture that is the same as the reference picture indicated by the reference index refidx of the reference picture list LX, a scaling process is performed. The vector information obtaining unit 202 outputs obtained motion vector information of a selected motion vector to the scaling factor calculation unit 201.

The scaling factor calculation unit 201 receives the motion vector information from the vector information obtaining unit 202, obtains the POCs of related pictures from the reference picture list storing unit 102, and calculates a scaling factor.

Here, CurrPoc indicates the POC of a target picture. The scaling factor calculation unit 201 obtains, from the reference picture list storing unit 102, the POC (CurrRefPoc) of a picture that the target block refers to, the POC (ColPicPoc) of a picture to which a motion vector to be scaled belongs, and the POC (ColRefPoc) of a picture that the motion vector refers to.

The scaling factor calculation unit 201 calculates a scaling factor using formulas below.

$$DiffPocD = ColPicPoc - ColRefPoc \quad \text{formula (6)}$$

$$DiffPocB = CurrPoc - CurrRefPoc \quad \text{formula (7)}$$

$$TDB = Clip3(-128, 127, DiffPocB) \quad \text{formula (8)}$$

$$TDD = Clip3(-128, 127, DiffPocD) \quad \text{formula (9)}$$

$$iX = (0x4000 + abs(TDD/2))/TDD \quad \text{formula (10)}$$

$$Scale = Clip3(-1024, 1023, (TDB \times iX + 32) >> 6) \quad \text{formula (11)}$$

abs (x): a function that returns an absolute value of x
Clip3(x, y, z): a function that returns a median of x, y, and z
>>: right arithmetic shift The calculated scaling factor Scale has an 8-bit precision after the decimal point. The scaling factor calculation unit 201 outputs the calculated scaling factor Scale to the scaling operation unit 203.

The scaling operation unit 203 scales the motion vector based on the motion vector information received from the vector information obtaining unit 202 and the scaling factor received from the scaling factor calculation unit 201.

Figure 8:
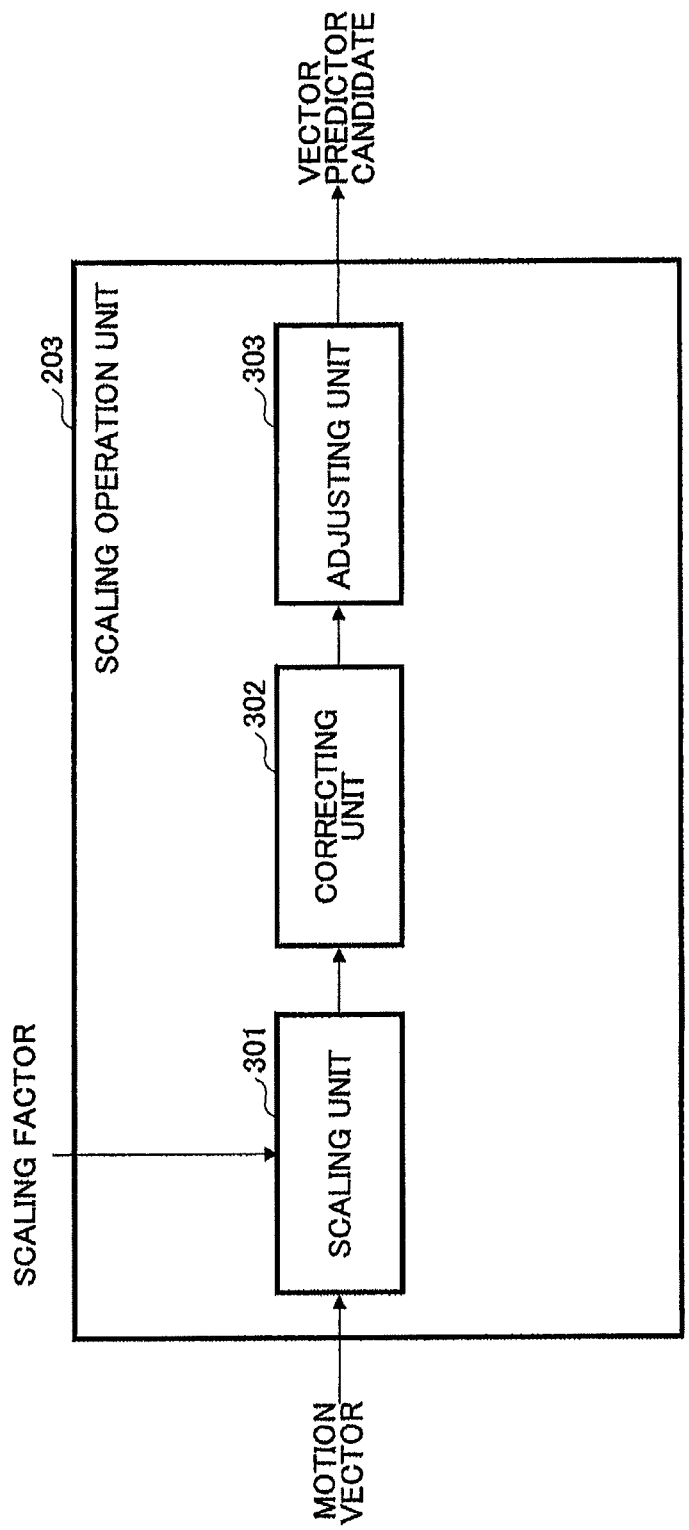
FIG. 8 is a block diagram illustrating an exemplary configuration of a scaling operation unit according to the first embodiment.

FIG. 8 is a block diagram illustrating an exemplary configuration of the scaling operation unit 203 of the first embodiment. The scaling operation unit 203 receives a scaling factor from the scaling factor calculation unit 201 and a motion vector (mvcx, mvcy) to be scaled from the vector information obtaining unit 202. The motion vector (mvcx, mvcy) to be scaled may be referred to as a pre-scaling vector predictor candidate. The scaling operation unit 203 outputs a scaled motion vector (mvcx', mvcy'). The scaled motion vector (mvcx', mvcy') may be referred to as a scaled vector predictor candidate.

As illustrated in FIG. 8, the scaling operation unit 203 may include a scaling unit 301, a correcting unit 302, and an adjusting unit 303. The scaling unit 301 multiplies the pre-scaled vector predictor candidate by a scaling factor with a predetermined precision after the decimal point to obtain a scaled vector predictor candidate. Accordingly, the precision after the decimal point of the scaled vector predictor candidate is increased to the precision after the decimal point of the scaling factor.

The correcting unit 302 corrects (or adjusts) the scaled vector predictor candidate toward 0 (or the 0 vector) by a predetermined amount. The adjusting unit 303 rounds the scaled and corrected vector predictor candidate to the nearest integers. Detailed operations of the scaling unit 301, the correcting unit 302, and the adjusting unit 303 are described below.

The scaling unit 301 multiplies the motion vector (mvcx, mvcy) by the scaling factor Scale. When the scaling factor has an N-bit precision after the decimal point, the precision after the decimal point of the multiplied (or scaled) motion vector is increased to N bits.

The correcting unit 302 subtracts a predetermined amount "a" from absolute values of the scaled motion vector to correct the scaled motion vector toward 0. The adjusting unit 303 adds 2N−1 to the values (or components) of the corrected motion vector and shifts the results of addition to the right by N bits to round the values to the nearest integers. Then, the adjusting unit 303 multiplies the rounded values by a sign of the scaled motion vector.

The above scaling operation performed by the scaling operation unit 203 is represented by formulas (15) and (16) below.

$$mvcx' = sign(Scale \times mvcx) \times \{(abs(Scale \times mvcx) - a + 2N-1) >> N\} \quad \text{formula (15)}$$

$$mvcy' = sign(Scale \times mvcy) \times \{(abs(Scale \times mvcy) - a + 2N-1) >> N\} \quad \text{formula (16)}$$

abs ( ): a function that returns an absolute value
sign ( ): a function that returns a sign (1 or −1)

In formulas (15) and (16), absolute values of the scaled motion vector (Scale×mvcx, Scale×mvcy) are obtained before subtracting the predetermined amount "a". This is to correct the values of the scaled motion vector toward 0 irrespective of whether the values are positive or negative. With formulas (15) and (16), the scaled motion vector is corrected toward the 0 vector by the predetermined amount "a". Correcting scaled motion vectors toward 0 by the predetermined amount "a" makes it possible to make an average of vector predictor candidates output by the scaling operation unit 203 close to 0.

When N=8, formulas (15) and (16) can be rewritten into formulas (17) and (18) below.

$$mvcx' = sign(Scale \times mvcx) \times \{(abs(Scale \times mvcx) - a + 128) >> 8\} \quad \text{formula (17)}$$

$$mvcy' = sign(Scale \times mvcy) \times \{(abs(Scale \times mvcy) - a + 128) >> 8\} \quad \text{formula (18)}$$

Through experiments, the inventors found out that the coding efficiency improves when the predetermined amount "a" is within a range $1 \leq a \leq 2N-2$. Therefore, when, for example, N=8, the predetermined amount "a" is preferably within a range $1 \leq a \leq 64$.

The predetermined amount "a" may be set at a fixed value selected from the range $1 \leq a \leq 2N-2$. Alternatively, an optimum value for the predetermined amount "a" may be dynamically determined depending on a scene or the scaling factor. An exemplary method of dynamically changing the value of the predetermined amount "a" depending on the scaling factor is described later.

Figure 9:
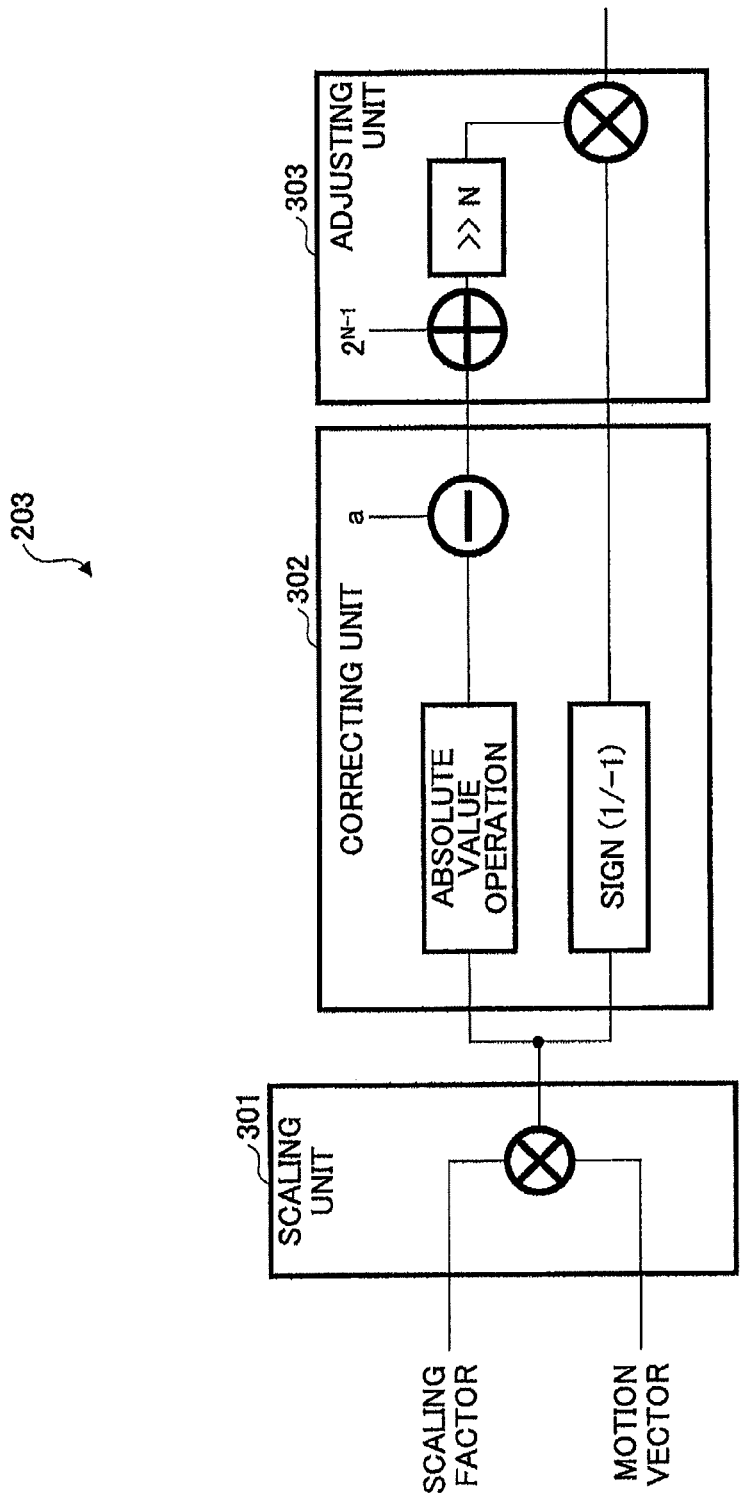
FIG. 9 is a block diagram illustrating exemplary configurations (1) of components of a scaling operation unit.

FIG. 9 is a block diagram illustrating exemplary configurations (1) of components of the scaling operation unit 203. Below, calculations performed by the components of the scaling operation unit 203 are described using mvcx in a motion vector (mvcx, mvcy). Similar calculations may also be performed for mvcy. In the example of FIG. 9, the scaling unit 301 calculates (Scale×mvcx) in formula (15).

The correcting unit 302 obtains the absolute value abs (Scale×mvcx) of (Scale×mvcx), and subtracts the predetermined amount "a" from the absolute value. The correcting unit 302 also calculates sign(Scale×mvcx) to obtain the sign of (Scale×mvcx).

The adjusting unit 303 adds 2N−1 to "abs(Scale×mvcx)−a", and shifts "abs(Scale×mvcx)−a+2N−1" by N bits. Next, the adjusting unit 303 multiplies the shifted value by the sign of (Scale×mvcx) to obtain mvcx'. In a similar manner, mvcy' is obtained. Then, the adjusting unit 303 outputs the scaled motion vector (mvcx', mvcy') as a vector predictor candidate.

Figure 10:
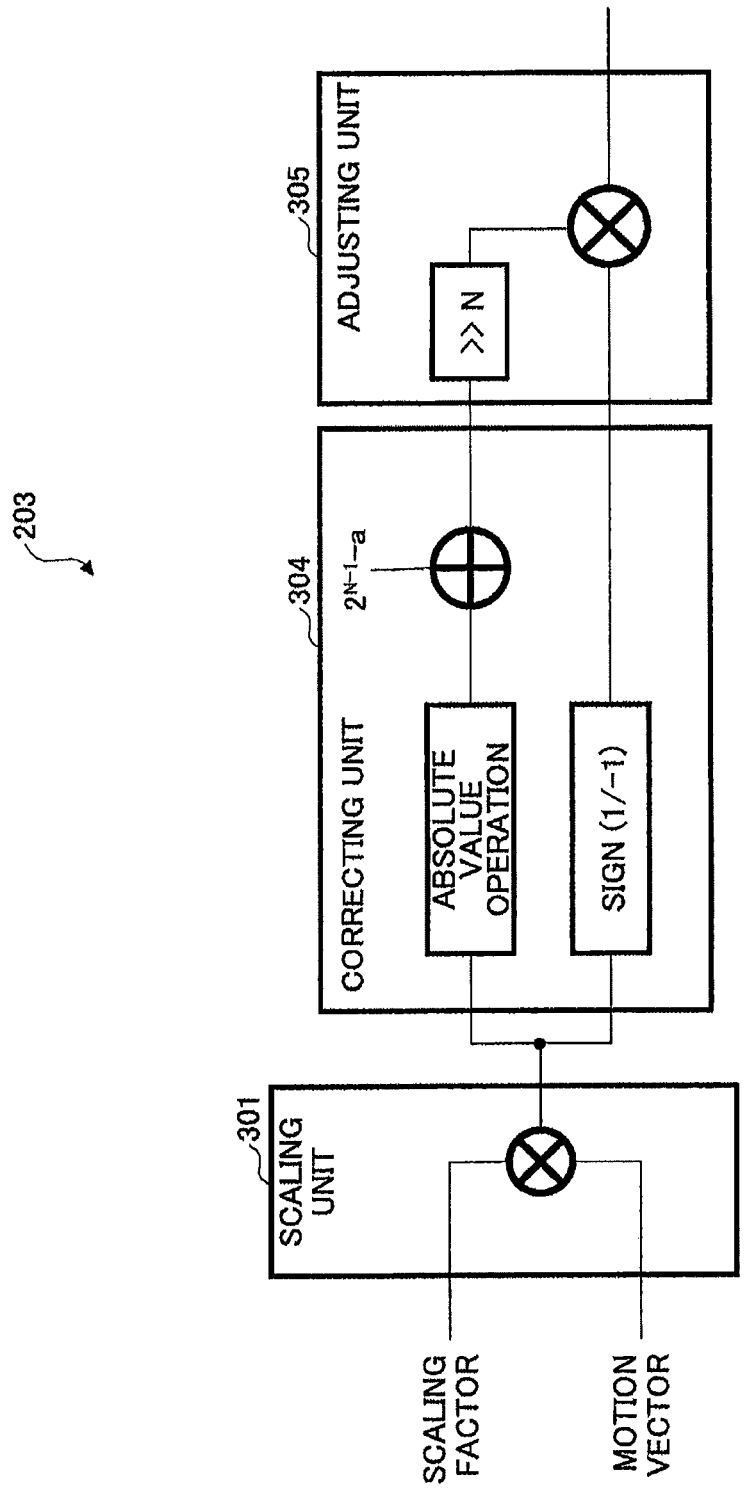
FIG. 10 is a block diagram illustrating exemplary configurations (2) of components of a scaling operation unit.

FIG. 10 is a block diagram illustrating exemplary configurations (2) of components of the scaling operation unit 203. In the example of FIG. 10, a correcting unit 304 adds "2N−1−a" to abs(Scale×mvcx).

An adjusting unit 305 shifts "abs(Scale×mvcx)+(a+2N−1)" output from the correcting unit 304 by N bits, and multiplies the shifted value by the sign of (Scale×mvcx). Operations of the scaling unit 301 of FIG. 10 are substantially the same as the scaling unit 301 of FIG. 9.

Figure 11:
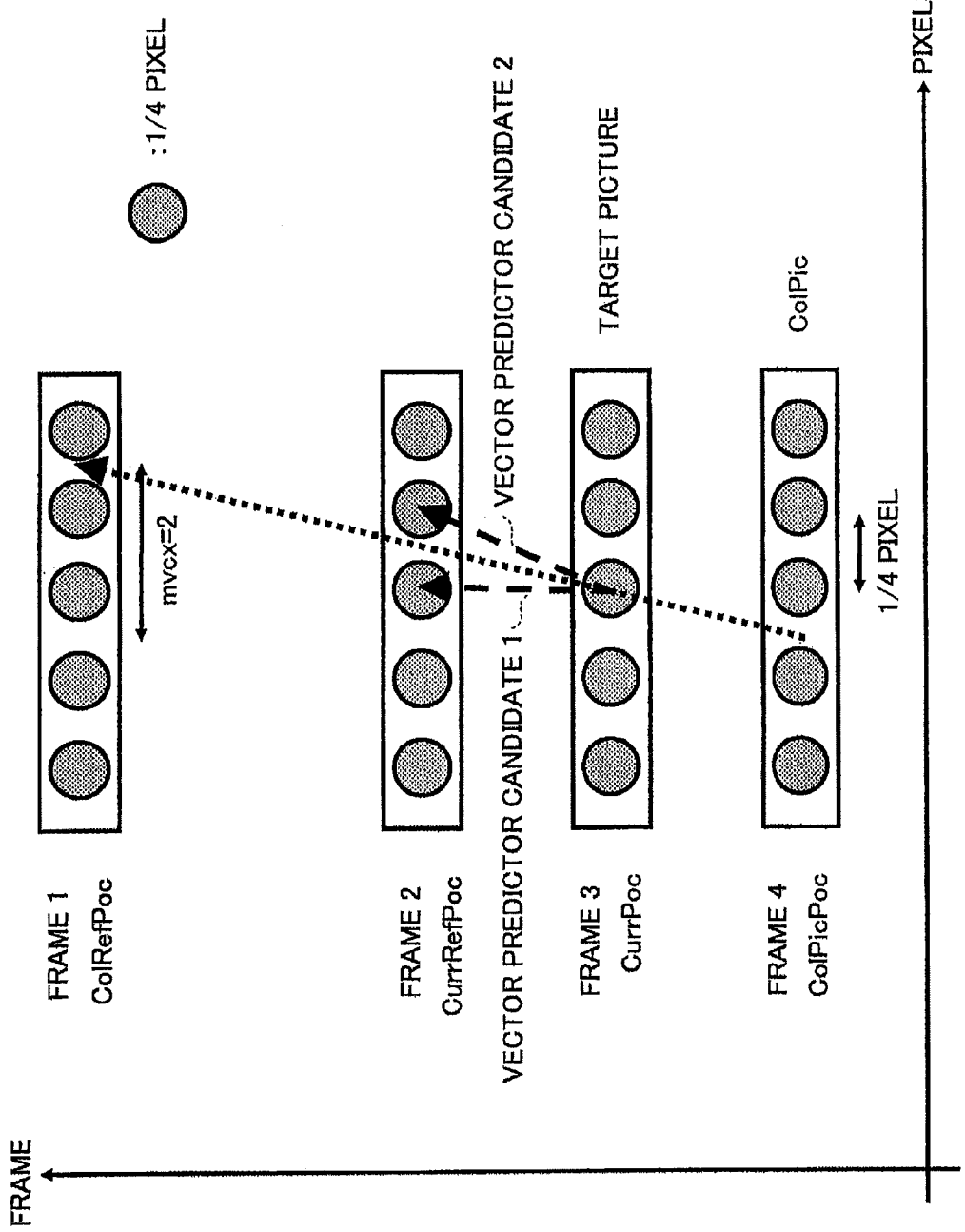
FIG. 11 is a drawing used to describe operations of a scaling operation unit.

FIG. 11 is a drawing used to describe an exemplary process performed by the scaling operation unit 203. In the example of FIG. 11, it is assumed that an input stream is a compressed video of a stationary object. Even when an object in the video is stationary, there is a case where a small motion vector that is not 0 is selected due to noises on pictures.

Let us assume a case where a temporally-adjacent motion vector is not 0 although an input stream is completely stationary and a 0 vector is expected. In this example, it is assumed that a temporally-adjacent motion vector (mvcx, mvcy) is (2, 0) (i.e., movement of 2/4 pixels and 0 pixels) and the temporally-adjacent motion vector (mvcx, mvcy) is scaled to one fourth by a scaling factor Scale=64. In this case, since mvcx/4=0.5, either mvcx'=0 or mvcx'=1 is selected for a vector predictor candidate to be output.

When the scaling operation method of formulas (12) and (13) is used, mvcx'=1 is selected (vector predictor candidate 2 in FIG. 11). Meanwhile, in the scaling operation unit 203 of the present embodiment that uses formulas (15) and (16), the scaling unit 301 outputs 2(mvcx)×64(Scale)=128. The correcting unit 302 calculates 128−a+128=256−a. When "a" is within the above described range, the adjusting unit 303 shifts "256−a" by 8 bits and outputs mvcx'=0 (vector predictor candidate 1 in FIG. 11).

Thus, the scaling operation unit 203 of the present embodiment is able to obtain (mvcx', mvcy')=(0, 0), i.e., a stationary vector predictor candidate that is expected.

Here, when N0 indicating the number of times that my is represented by (0, 0) is greater than N1 indicating the number of times that my is represented by (1, 0) (N0>N1), it indicates that, compared with the related art, the present embodiment makes it possible to increase the number of times that the vector predictor is represented by the 0 vector. This in turn makes it possible to reduce the amount of code of difference vectors and to improve the coding efficiency.

Figure 12:
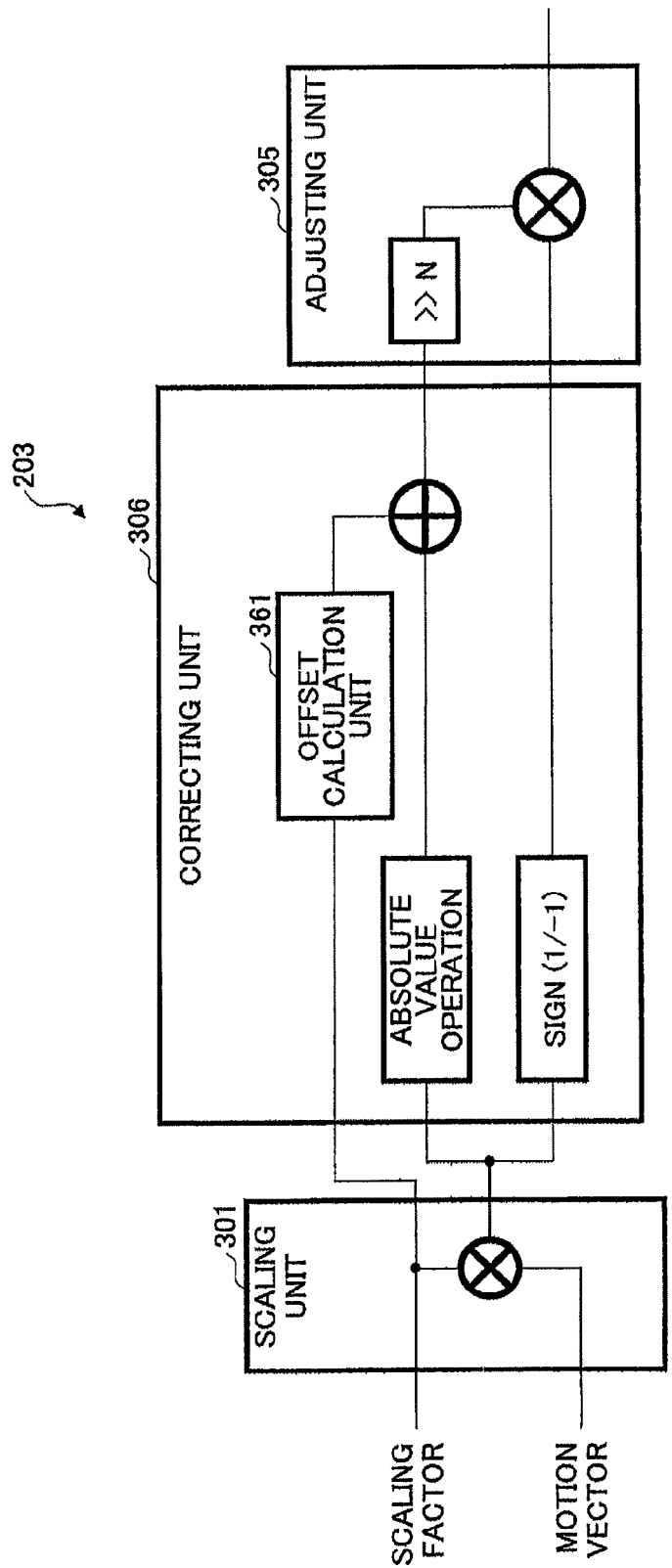
FIG. 12 is a block diagram illustrating exemplary configurations (3) of components of a scaling operation unit.

Another scaling operation method as described below may also be used. FIG. 12 is a block diagram illustrating exemplary configurations (3) of components of the scaling operation unit 203. In the example of FIG. 12, the predetermined amount "a" is calculated based on the magnitude of the scaling factor. Here, "2N−1−a" is called an offset.

In FIG. 12, a correcting unit 306 includes an offset calculation unit 361. The offset calculation unit 361 obtains the scaling factor from the scaling unit 301, calculates the predetermined amount "a" based on the magnitude of the scaling factor, and calculates the offset (2N−1−a). For example, the offset calculation unit 361 calculates the predetermined amount "a" using formula (19) below.

$$a = \mathrm{MIN}(2N-2, \mathrm{abs}(\mathrm{Scale}) >> 3) \quad \text{formula (19)}$$

MIN (x, y): a function that returns the smaller one of x and y

With formula (19), when the absolute value of the scaling factor Scale becomes large, the predetermined amount "a" becomes also large and the scaled value is corrected toward the 0 vector by a greater degree. In other words, formula (19) indicates that the predetermined amount "a" increases up to 2N−2 as the scaling factor increases.

As described above, correcting a scaled vector predictor candidate toward the 0 vector makes it possible to improve the accuracy of a vector predictor.

<Operations>

Figure 13:
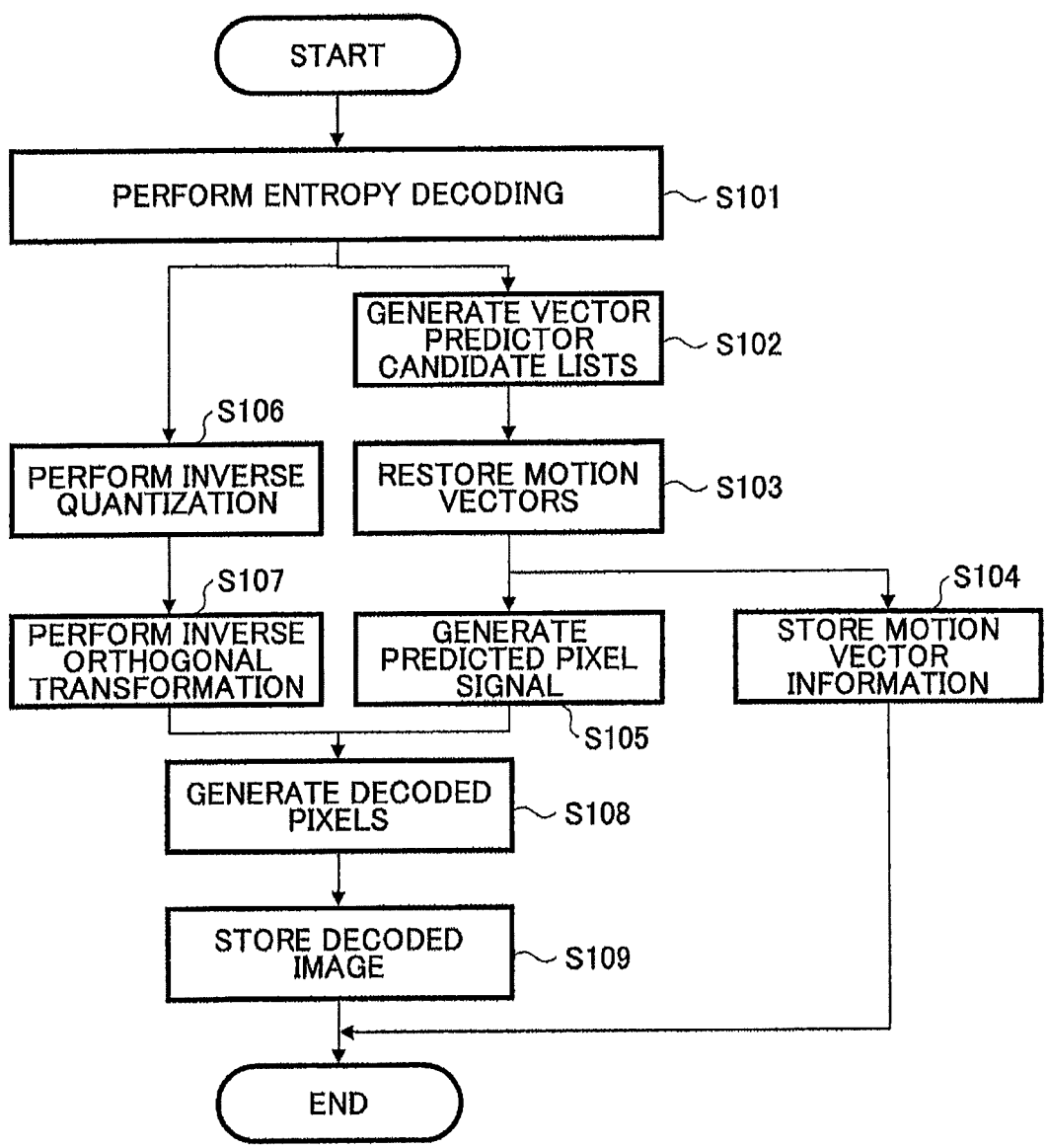
FIG. 13 is a flowchart illustrating an exemplary process performed by a video decoding apparatus of the first embodiment.

Next, exemplary operations of the video decoding apparatus 100 of the first embodiment are described. FIG. 13 is a flowchart illustrating an exemplary process performed by the video decoding apparatus 100 of the first embodiment. In the process of FIG. 13, one block, which is a unit of processing, is decoded.

In step S101, the entropy decoding unit 101 performs entropy decoding on input stream data, and thereby decodes a reference index, a difference vector, and a predictor candidate index for L0 of the target block; a reference index, a difference vector, and a predictor candidate index for L1 of the target block; and an orthogonal transformation coefficient.

In step S102, the vector predictor generating unit 104 generates lists (vector predictor candidate lists) of vector predictor candidates for L0 and L1 based on the decoded reference indexes of L0 and L1 and motion vector information.

In step S103, the motion vector restoring unit 105 obtains the predictor candidate indexes and the difference vectors of L0 and L1 which are decoded by the entropy decoding unit 101. The motion vector restoring unit 105 identifies vector predictors for L0 and L1 from the vector predictor candidate lists based on the predictor candidate indexes. Then, the motion vector restoring unit 105 adds the identified vector predictors and the difference vectors to restore motion vectors of L0 and L1 (L0 and L1 motion vectors).

In step S104, the motion vector restoring unit 105 stores motion vector information including the reference indexes for the restored motion vectors of L0 and L1 in the motion vector information storing unit 103. The stored information is used in the subsequent block decoding process.

In step S105, the predicted pixel generating unit 106 obtains the L0 motion vector and the L1 motion vector, obtains pixel data of regions that the motion vectors refer to from the decoded image storing unit 110, and generates a predicted pixel signal.

In step S106, the inverse quantization unit 107 performs inverse quantization on the orthogonal transformation coefficient decoded by the entropy decoding unit 101.

In step S107, the inverse orthogonal transformation unit 108 generates a prediction error signal by performing inverse orthogonal transformation on the inversely-quantized signal.

Steps S102 through S104 and steps S106 and S107 are not necessarily performed in the order described above, and may be performed in parallel.

In step S108, the decoded pixel generating unit 109 adds the predicted pixel signal and the prediction error signal to generate decoded pixels.

In step S109, the decoded image storing unit 110 stores a decoded image including the decoded pixels. The decoding process of one block is completed through the above steps, and the steps are repeated to decode the next block.

Next, operations of the vector predictor generating unit 104 are described further.

<Vector Predictor Candidates of Spatially-Adjacent Blocks>

Figure 14:
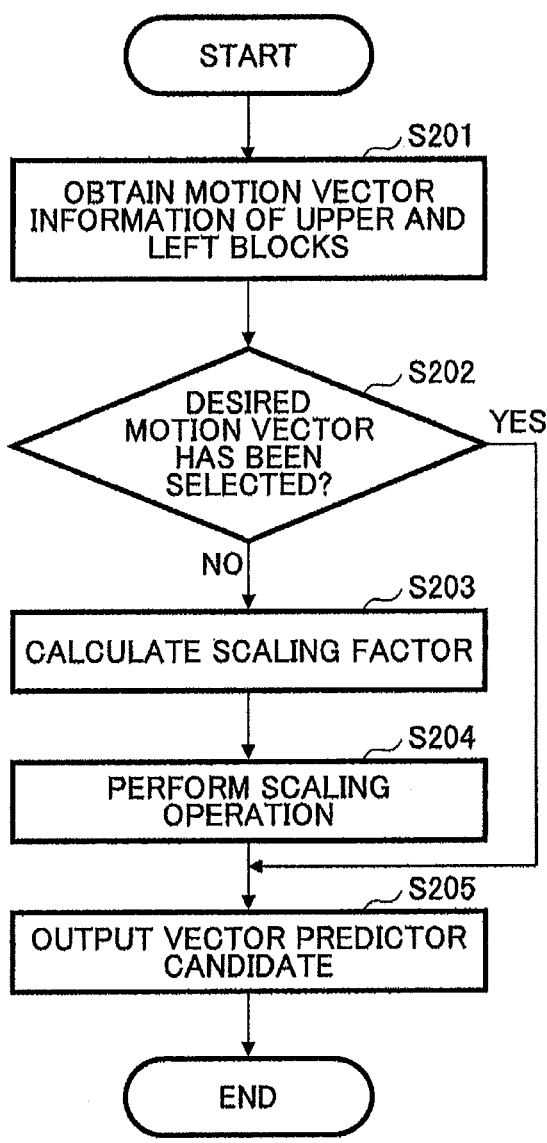
FIG. 14 is a flowchart illustrating an exemplary process (1) performed by a vector predictor generating unit of the first embodiment.

An exemplary process of generating vector predictor candidates of blocks spatially adjacent to the target block is described. FIG. 14 is a flowchart illustrating an exemplary process (1) performed by the vector predictor generating unit 104 of the first embodiment. In step S201 of FIG. 14, the vector information obtaining unit 202 sequentially obtains motion vector information (of selected motion vectors) of blocks (upper and left blocks) that are spatially adjacent to the target block. The motion vector information is obtained in a manner as described above.

In step S202, the vector information obtaining unit 202 determines whether a desired motion vector, which refers to a reference picture that is the same as the reference picture indicated by the reference index refidx of the reference picture list LX, has been selected. If the desired motion vector has been selected (YES in step S202), the process proceeds to step S205. Meanwhile, if the desired motion vector has not been selected (NO in step S202), the process proceeds to step S203.

In step S203, the scaling factor calculation unit 201 calculates a scaling factor using formulas (6) through (11) described above.

In step S204, the scaling operation unit 203 scales a motion vector (that is selected by the vector information obtaining unit 202 and is different from the desired motion vector) using the calculated scaling factor, corrects the scaled motion vector toward the 0 vector by a predetermined amount, and performs a bit shift on the corrected motion vector.

In step S205, the scaling operation unit 203 outputs the scaled and corrected motion vector as a vector predictor candidate. Meanwhile, when the desired motion vector has been selected, the scaling operation unit 203 outputs the desired motion vector as a vector predictor candidate without performing the scaling operation.

<Vector Predictor Candidates of Temporally-Adjacent Blocks>

Figure 15:
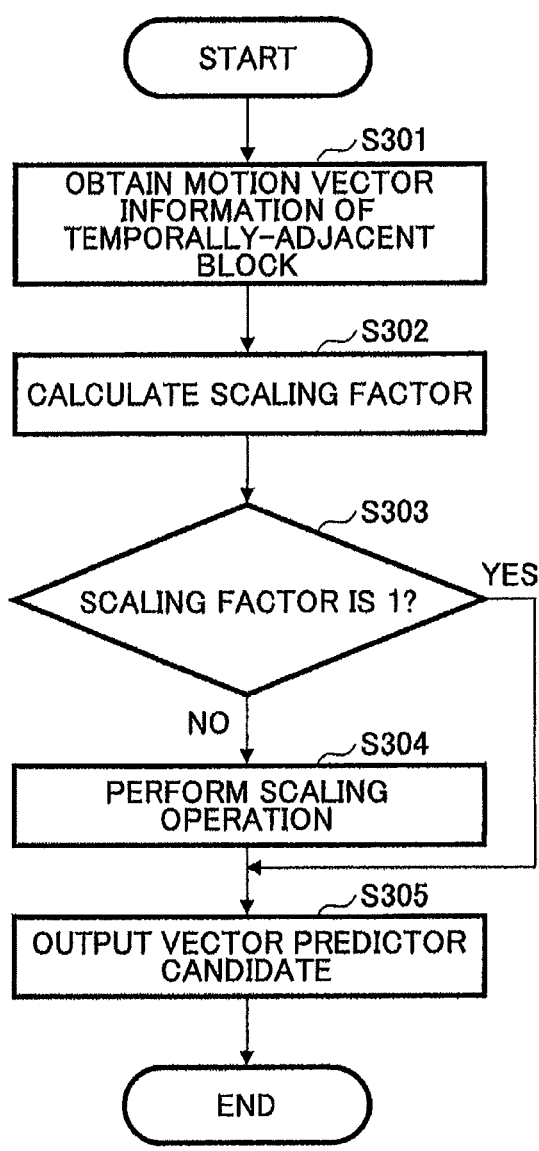
FIG. 15 is a flowchart illustrating an exemplary process (2) performed by a vector predictor generating unit of the first embodiment.

Next, an exemplary process of generating vector predictor candidates of blocks temporally adjacent to the target block is described. FIG. 15 is a flowchart illustrating an exemplary process (2) performed by the vector predictor generating unit 104 of the first embodiment.

In step S301 of FIG. 15, the vector information obtaining unit 202 obtains motion vector information (of a selected motion vector) of a block (temporally-adjacent block) that is temporally adjacent to the target block. The motion vector information is obtained in a manner as described above.

In step S302, the scaling factor calculation unit 201 calculates a scaling factor Scale using formulas (6) through (11) described above.

In step S303, the scaling factor calculation unit 201 determines whether the calculated scaling factor Scale is 1. If the scaling factor is not 1 (NO in step S303), the process proceeds to step S304. Meanwhile, if the scaling factor is 1 (YES in step S303), the process proceeds to step S305.

In step S304, the scaling operation unit 304 scales the selected motion vector using the calculated scaling factor, corrects the scaled motion vector toward the 0 vector by a predetermined amount, and performs a bit shift on the corrected motion vector.

In step S305, the scaling operation unit 203 outputs the scaled and corrected motion vector as a vector predictor candidate. Meanwhile, when the scaling factor is 1, the scaling operation unit 203 outputs the selected motion vector as a vector predictor candidate without performing the scaling operation.

Thus, according to the first embodiment, a vector predictor candidate is corrected toward the 0 vector. This method or configuration makes it possible to improve the accuracy of vector predictors, to reduce the amount of code of difference vectors, and thereby to improve the coding efficiency.

<<Second Embodiment<<

Next, a video decoding apparatus according to a second embodiment is described. In the second embodiment, different scaling operations are performed depending on whether a picture including a motion vector used as a vector predictor candidate is spatially adjacent or temporally adjacent to the target block.

<Configuration>

Components of the video decoding apparatus of the second embodiment, excluding a vector predictor generating unit 400, are substantially the same as those of the video decoding apparatus 100 of the first embodiment. Therefore, the vector predictor generating unit 400 is mainly described below.

Figure 16:
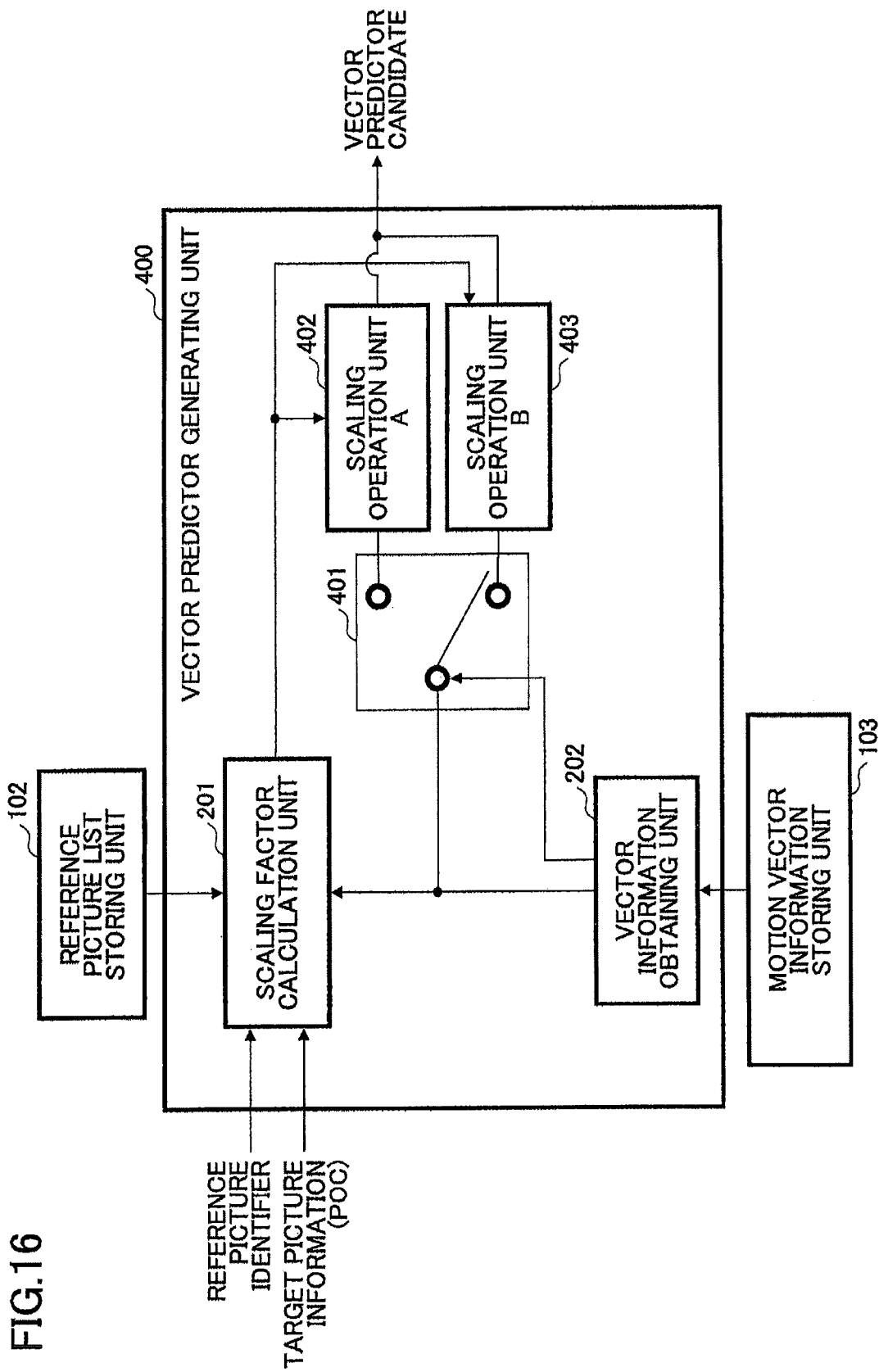
FIG. 16 is a block diagram illustrating an exemplary configuration of a vector predictor generating unit according to a second embodiment.

FIG. 16 is a block diagram illustrating an exemplary configuration of the vector predictor generating unit 400 according to the second embodiment. In the exemplary configuration of FIG. 16, the vector predictor generating unit 400 may include a scaling factor calculation unit 201, a vector information obtaining unit 202, a block determining unit 401, and scaling operation units A402 and B403 that are adaptively switched. The same reference numbers as in the first embodiment are assigned to the corresponding components in FIG. 16, and descriptions of those components are omitted here.

The block determining unit 401 determines whether a block including a motion vector used to generate a vector predictor candidate is spatially adjacent or temporally adjacent to the target block. The block determining unit 401 selects the scaling operation unit A402 when the block is temporally adjacent to the target block and selects the scaling operation unit B403 when the block is temporally adjacent to the target block.

The scaling operation unit A402 performs a scaling operation using formulas (15) and (16) in substantially the same manner as the scaling operation unit 203 of the first embodiment, and thereby corrects a scaled vector predictor candidate.

Meanwhile, the scaling operation unit B403 performs a scaling operation on a vector predictor candidate using formulas (12) and (13). Thus, a motion vector generated by one of the scaling operation units A402 and B403 is used as a vector predictor candidate.

The configuration of the second embodiment is based on an assumption that the tendency of the appearance probability distribution of my differs depending on whether a block including a motion vector used to generate a vector predictor candidate is spatially adjacent or temporally adjacent to the target block. Here, information indicating whether a block is spatially adjacent or temporally adjacent to the target block is referred to as adjacency information.

For example, when a block including a motion vector is temporally adjacent to the target block, the probability that the motion vector is scaled is high. Therefore, in this case, correcting the motion vector as described in the first embodiment is preferable to improve the coding efficiency. Meanwhile, when a block including a motion vector is spatially adjacent to the target block, the probability that the motion vector is scaled is low. Therefore, in this case, scaling the motion vector using formulas (12) and (13) may not cause a problem.

Although plural scaling operation units are used in the example of FIG. 16, the second embodiment may also be implemented using one scaling operation unit. In this case, the block determining unit 401 sends the adjacency information to the scaling operation unit.

The scaling operation unit performs a scaling operation using formulas (15) and (16) if the adjacency information indicates that the block is temporally adjacent to the target block, and performs a scaling operation excluding the subtraction of the predetermined amount "a" in formulas (15) and (16) if the adjacency information indicates that the block is spatially adjacent to the target block.

Thus, the second embodiment may also be implemented using one scaling operation unit that determines whether to subtract the predetermined amount "a" from a scaled motion vector based on the determination result of the block determining unit 401.

<Operations>

Exemplary operations of the video decoding apparatus of the second embodiment are described below. The decoding process performed by the video decoding apparatus of the second embodiment is substantially the same as that illustrated in FIG. 13, and therefore its descriptions are omitted here.

Figure 17:
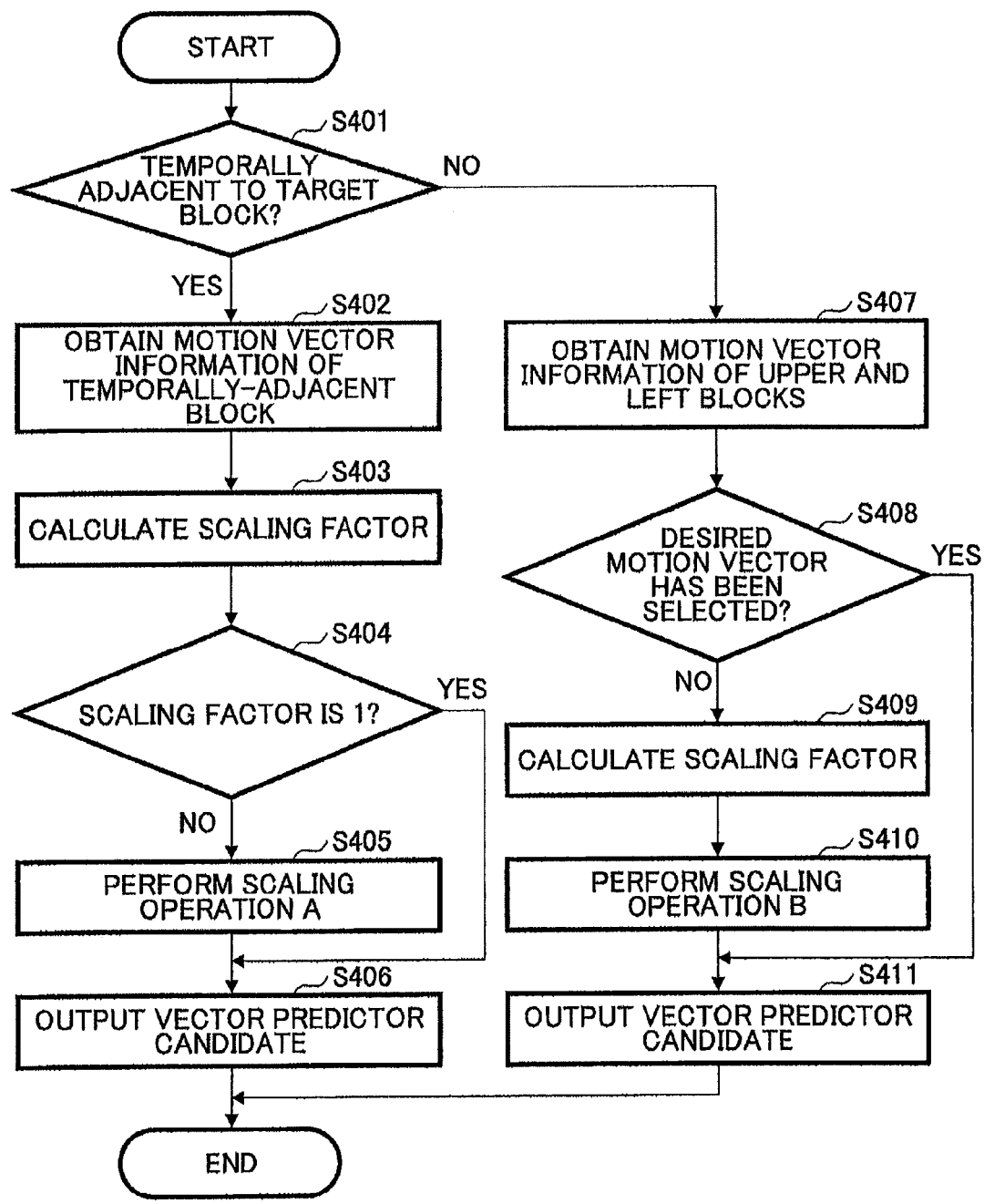
FIG. 17 is a flowchart illustrating an exemplary process performed by a vector predictor generating unit of the second embodiment.

FIG. 17 is a flowchart illustrating an exemplary process performed by the vector predictor generating unit 400 of the second embodiment.

In step S401, the vector predictor generating unit 400 determines whether a block including a motion vector used for a vector predictor candidate is spatially adjacent or temporally adjacent to the target block. For example, whether a block is spatially adjacent or temporally adjacent to the target block may be determined based on the reference picture identifier. If the block is temporally adjacent to the target block (YES in step S401), the process proceeds to step S402. Meanwhile, if the block is spatially adjacent to the target block (NO in step S401), the process proceeds to step S407.

Since steps S402 through S406 are substantially the same as steps S301 through S305 of FIG. 15, their descriptions are omitted here. Scaling operation A in step S405 is performed by the scaling operation unit A402 using formulas (15) and (16).

Similarly, since steps S407 through S409 and S411 are substantially the same as steps S201 through S203 and S205 of FIG. 14, their descriptions are omitted here.

In step S410, the scaling operation unit B403 performs a scaling operation B using formulas (12) and (13).

As described above, the second embodiment makes it possible to adaptively switch scaling operations based on the adjacency information of a block including a motion vector used as a vector predictor candidate, and thereby makes it possible to improve the accuracy of a vector predictor.

<<Third Embodiment<<

Next, a video decoding apparatus according to a third embodiment is described. In the third embodiment, different scaling operations are performed depending on the magnitude of a motion vector used as a vector predictor candidate.

<Configuration>

Components of the video decoding apparatus of the third embodiment, excluding a vector predictor generating unit 500, are substantially the same as those of the video decoding apparatus 100 of the first embodiment. Therefore, the vector predictor generating unit 500 is mainly described below.

Figure 18:
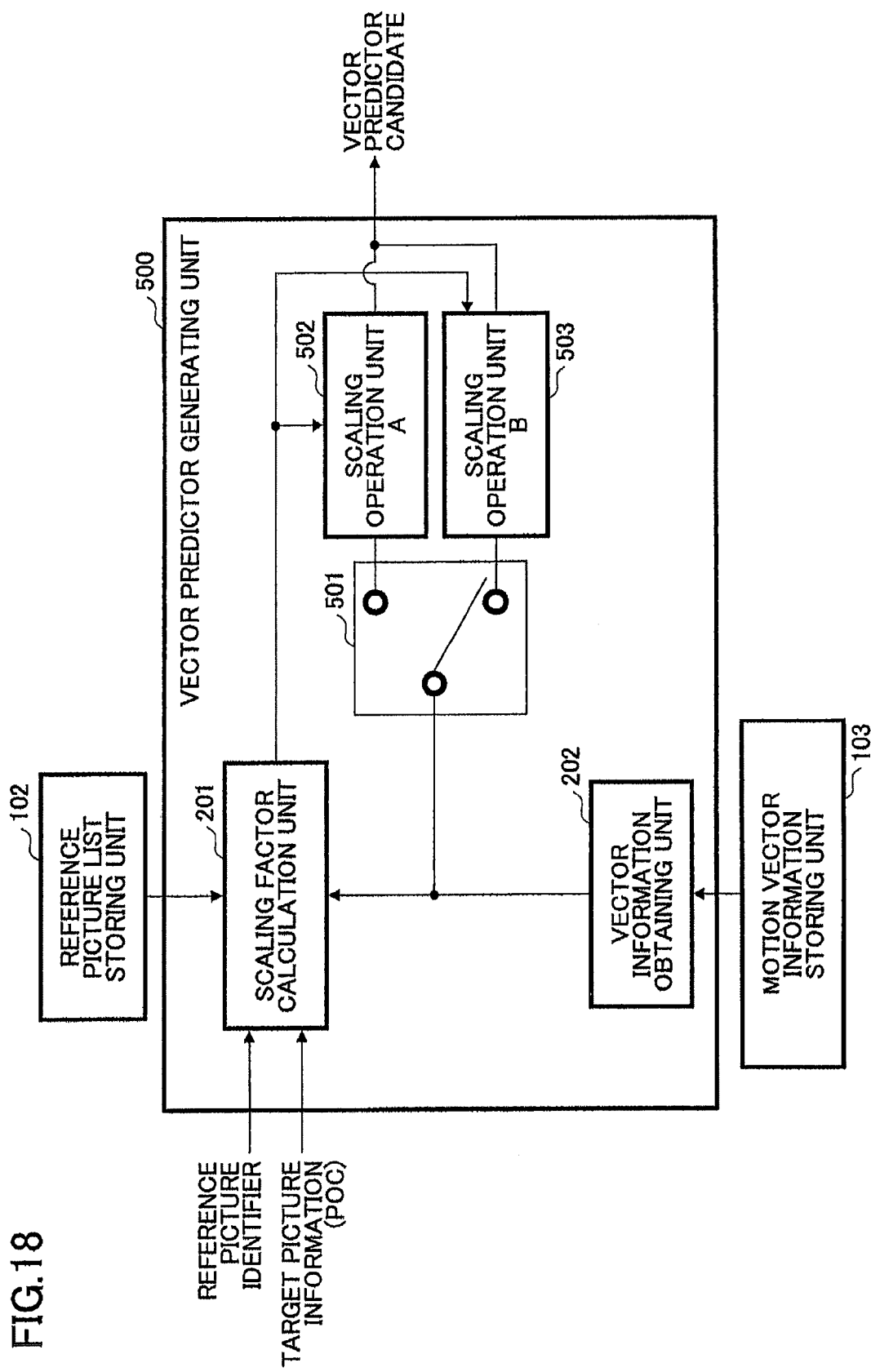
FIG. 18 is a block diagram illustrating an exemplary configuration of a vector predictor generating unit according to a third embodiment.

FIG. 18 is a block diagram illustrating an exemplary configuration of the vector predictor generating unit 500 according to the third embodiment.

In the exemplary configuration of FIG. 18, the vector predictor generating unit 500 may include a scaling factor calculation unit 201, a vector information obtaining unit 202, a motion vector determining unit 501, and scaling operation units A502 and B503 that are adaptively switched. The same reference numbers as in the first embodiment are assigned to the corresponding components in FIG. 18, and descriptions of those components are omitted here.

The motion vector determining unit 501 switches the scaling operation units A502 and B503 based on the magnitude of an input motion vector before scaling (or a pre-scaling vector predictor candidate). For example, the motion vector determining unit 501 determines whether the magnitude of an input motion vector is less than or equal to a predetermined value (e.g., 16).

The motion vector determining unit 501 selects the scaling operation unit A502 if the magnitude of the motion vector is less than or equal to the predetermined value, and selects the scaling operation unit B503 if the magnitude of the motion vector is greater than the predetermined value.

The scaling operation unit A502 performs a scaling operation using formulas (15) and (16) in substantially the same manner as the scaling operation unit 203 of the first embodiment, and thereby corrects a scaled vector predictor candidate.

Meanwhile, the scaling operation unit B503 performs a scaling operation on a vector predictor candidate using formulas (12) and (13). Thus, a motion vector generated by one of the scaling operation units A502 and B503 is used as a vector predictor candidate.

The configuration of the third embodiment is based on an assumption that the tendency of the appearance probability distribution of my differs depending on the magnitude of a pre-scaling motion vector (or a pre-scaling vector predictor candidate). The influence of an error of a vector predictor increases as the absolute value of the motion vector becomes smaller. For this reason, in the third embodiment, a motion vector is corrected as in the first embodiment when the absolute value of the motion vector is small.

Although plural scaling operation units are used in the example of FIG. 18, the third embodiment may also be implemented using one scaling operation unit. In this case, the motion vector determining unit 501 sends information indicating whether the, magnitude of the motion vector is less than or equal to the predetermined value to the scaling operation unit.

The scaling operation unit performs a scaling operation using formulas (15) and (16) if the magnitude of the motion vector is less than or equal to the predetermined value, and performs a scaling operation excluding the subtraction of the predetermined amount "a" in formulas (15) and (16) if the magnitude of the motion vector is greater than the predetermined value.

Thus, the third embodiment may also be implemented using one scaling operation unit that determines whether to subtract the predetermined amount "a" from a scaled motion vector based on the determination result of the motion vector determining unit 501.

<Operations>

Exemplary operations of the video decoding apparatus of the third embodiment are described below. The decoding process performed by the video decoding apparatus of the third embodiment is substantially the same as that illustrated in FIG. 13, and therefore its descriptions are omitted here. Exemplary processes performed by the vector predictor generating unit 500 are described below.

<Vector Predictor Candidates of Spatially-Adjacent Blocks>

Figure 19:
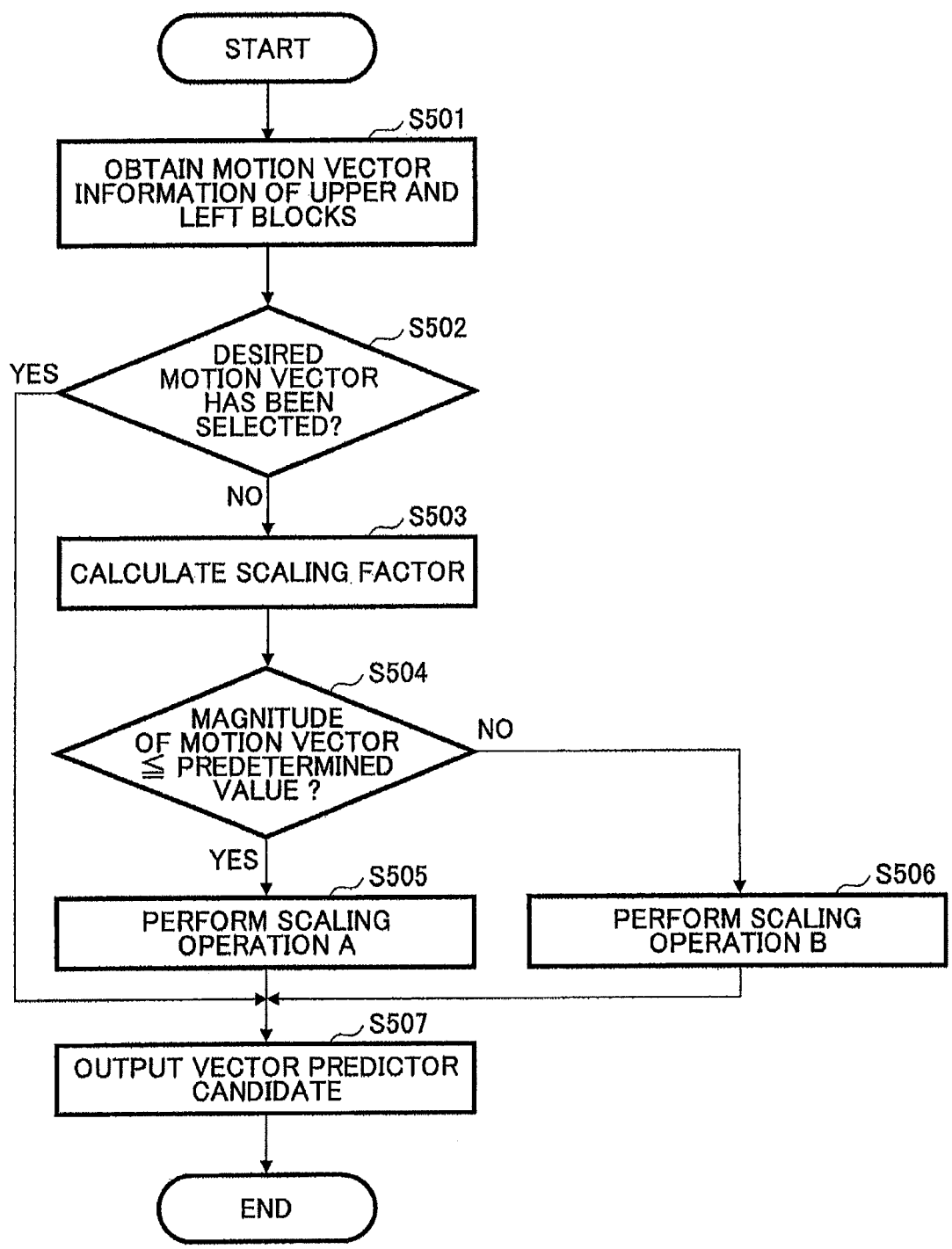
FIG. 19 is a flowchart illustrating an exemplary process (1) performed by a vector predictor generating unit of the third embodiment.

FIG. 19 is a flowchart illustrating an exemplary process (1) performed by the vector predictor generating unit 500 of the third embodiment. Steps S501 through S503 of FIG. 19 are substantially the same as steps S201 through S203 of FIG. 14.

In step S504, the motion vector determining unit 501 determines whether the magnitude of a motion vector (vector predictor candidate) is less than or equal to the predetermined value. If the magnitude of the motion vector is less than or equal to the predetermined value (YES in step S504), the process proceeds to step S505. Meanwhile, if the magnitude of the motion vector is greater than the predetermined value (NO in step S504), the process proceeds to step S506.

In step S505, the scaling operation unit A502 performs a scaling operation using formulas (15) and (16) where a scaled vector predictor candidate is corrected by the predetermined amount "a".

In step S506, the scaling operation unit B503 performs a scaling operation using formulas (12) and (13).

In step S507, the vector predictor generating unit 500 outputs the motion vector calculated by the scaling operation unit A502 or B503 as a vector predictor candidate. Meanwhile, when a desired motion vector has been selected, the vector predictor generating unit 500 outputs the desired motion vector as a vector predictor candidate without performing the scaling operation.

<Vector Predictor Candidates of Temporally-Adjacent Blocks>

Figure 20:
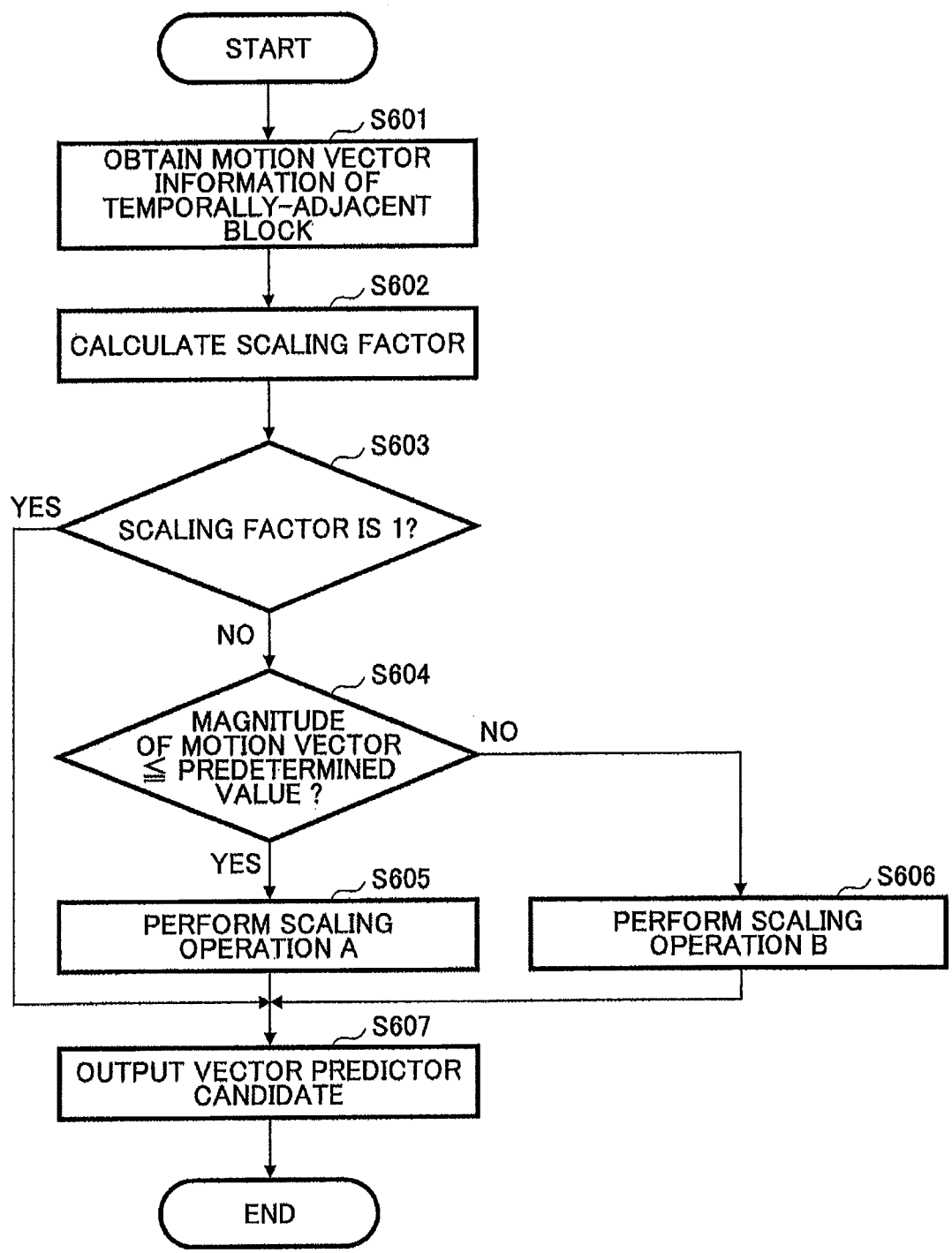
FIG. 20 is a flowchart illustrating an exemplary process (2) performed by a vector predictor generating unit of the third embodiment.

FIG. 20 is a flowchart illustrating an exemplary process (2) performed by the vector predictor generating unit 500 of the third embodiment.

Steps S601 through S603 of FIG. 20 are substantially the same as steps S301 through S303 of FIG. 15.

In step S604, the motion vector determining unit 501 determines whether the magnitude of a motion vector (vector predictor candidate) is less than or equal to the predetermined value. If the magnitude of the motion vector is less than or equal to the predetermined value (YES in step S604), the process proceeds to step S605. Meanwhile, if the magnitude of the motion vector is greater than the predetermined value (NO in step S604), the process proceeds to step S606.

In step S605, the scaling operation unit A502 performs a scaling operation using formulas (15) and (16) where a scaled vector predictor candidate is corrected by the predetermined amount "a".

In step S606, the scaling operation unit B503 performs a scaling operation using formulas (12) and (13).

In step S607, the vector predictor generating unit 500 outputs the motion vector calculated by the scaling operation unit A502 or B503 as a vector predictor candidate. Meanwhile, when the scaling factor is 1, the vector predictor generating unit 500 outputs the motion vector as a vector predictor candidate without performing the scaling operation.

As described above, the third embodiment makes it possible to adaptively switch scaling operations based on the magnitude of a motion vector used as a vector predictor candidate, and thereby makes it possible to improve the accuracy of a vector predictor.

<<Fourth Embodiment<<

Next, a video decoding apparatus according to a fourth embodiment is described. In the fourth embodiment, different scaling operations are performed based on the difference between the display time of a picture including a pre-scaling motion vector (vector predictor candidate) and the display time of a picture that the pre-scaling motion vector refers to.

<Configuration>

Components of the video decoding apparatus of the fourth embodiment, excluding a vector predictor generating unit 600, are substantially the same as those of the video decoding apparatus 100 of the first embodiment. Therefore, the vector predictor generating unit 600 is mainly described below.

Figure 21:
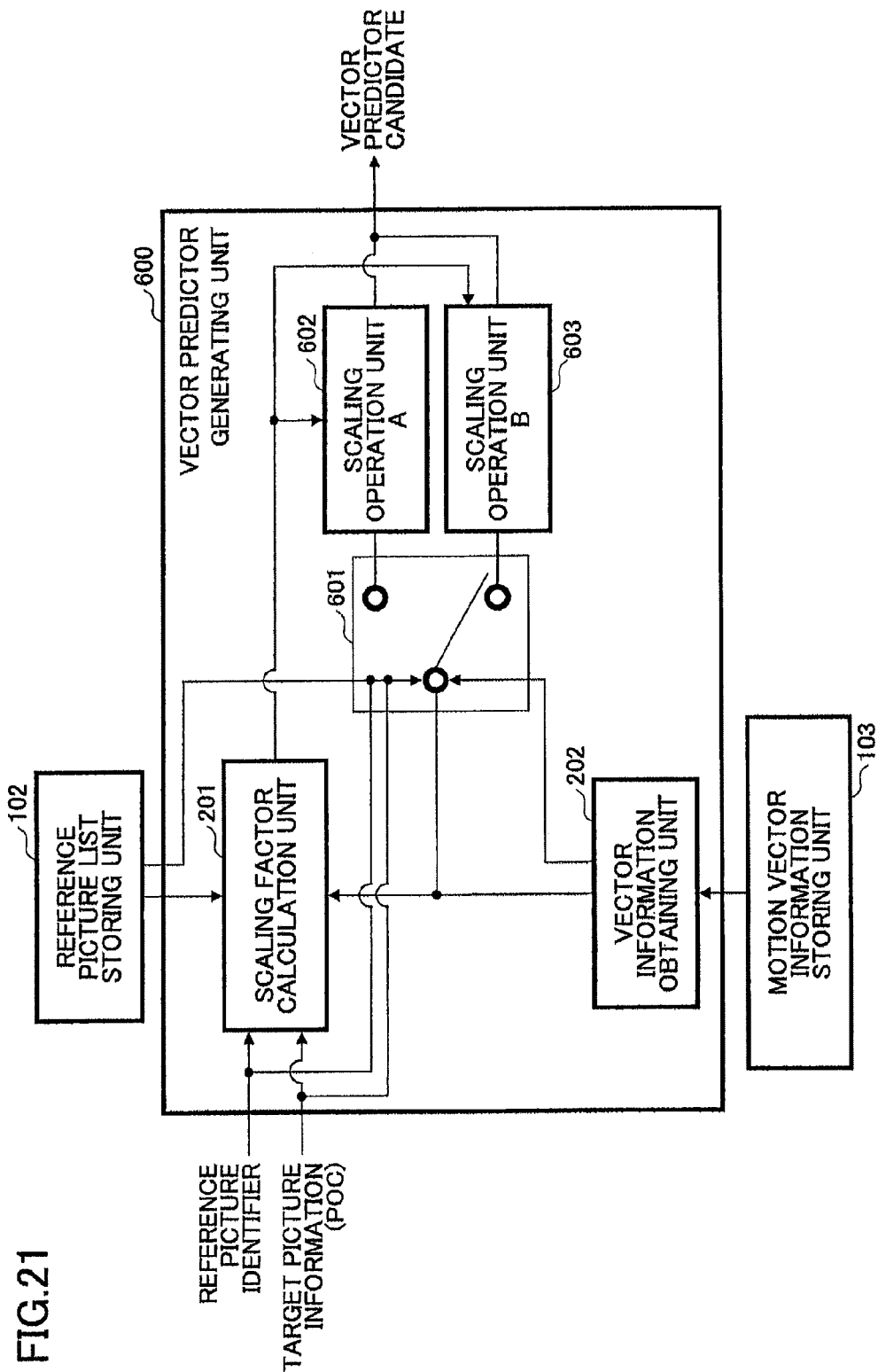
FIG. 21 is a block diagram illustrating an exemplary configuration of a vector predictor generating unit according to a fourth embodiment.

FIG. 21 is a block diagram illustrating an exemplary configuration of the vector predictor generating unit 600 according to the fourth embodiment. In the exemplary configuration of FIG. 21, the vector predictor generating unit 600 includes a scaling factor calculation unit 201, a vector information obtaining unit 202, a time difference determining unit 601, and scaling operation units A602 and B603 that are adaptively switched. The same reference numbers as in the first embodiment are assigned to the corresponding components in FIG. 21, and descriptions of those components are omitted here.

The time difference determining unit 601 switches the scaling operation units A602 and B603 based on the difference between the display time of a picture including a pre-scaling motion vector (vector predictor candidate) and the display time of a picture that the pre-scaling motion vector refers to.

For example, the time difference determining unit 601 obtains the reference picture identifier of a target block and the POC of a target picture. Also, the time difference determining unit 601 obtains the identifier of a picture including a pre-scaling motion vector (vector predictor candidate) selected by the vector information obtaining unit 202 and a picture that the pre-scaling motion vector refers to.

The time difference determining unit 601 obtains, from the reference picture list storing unit 102, the POCs of the picture including the pre-scaling motion vector (vector predictor candidate) and the picture that the pre-scaling motion vector refers to, and calculates the time difference between the POCs.

Then, the time difference determining unit 601 determines whether the time difference between the POCs (or the interval between the pictures) is less than or equal to a predetermined value (e.g., 4).

The time difference determining unit 601 selects the scaling operation unit A602 if the time difference is less than or equal to the predetermined value, and selects the scaling operation unit B603 if the time difference is greater than the predetermined value.

The scaling operation unit A602 performs a scaling operation using formulas (15) and (16) in substantially the same manner as the scaling operation unit 203 of the first embodiment, and thereby corrects a scaled vector predictor candidate.

Meanwhile, the scaling operation unit B603 performs a scaling operation on a vector predictor candidate using formulas (12) and (13). Thus, a motion vector generated by one of the scaling operation units A602 and B603 is used as a vector predictor candidate.

The configuration of the fourth embodiment is based on an assumption that the tendency of the appearance probability distribution of my differs depending on the difference between the display time of a picture including a pre-scaling motion vector (vector predictor candidate) and the display time of a picture that the pre-scaling motion vector refers to.

Although plural scaling operation units are used in the example of FIG. 21, the fourth embodiment may also be implemented using one scaling operation unit. In this case, the time difference determining unit 601 sends information indicating whether the calculated time difference is less than or equal to the predetermined value to the scaling operation unit.

The scaling operation unit performs a scaling operation using formulas (15) and (16) if the time difference is less than or equal to the predetermined value, and performs a scaling operation excluding the subtraction of the predetermined amount "a" in formulas (15) and (16) if the time difference is greater than the predetermined value.

Thus, the fourth embodiment may also be implemented using one scaling operation unit that determines whether to subtract the predetermined amount "a" from a scaled motion vector based on the determination result of the time difference determining unit 601.

<Operations>

Exemplary operations of the video decoding apparatus of the fourth embodiment are described below. The decoding process performed by the video decoding apparatus of the fourth embodiment is substantially the same as that illustrated in FIG. 13, and therefore its descriptions are omitted here. Exemplary processes performed by the vector predictor generating unit 600 are described below.

<Vector Predictor Candidates of Spatially-Adjacent Blocks>

Figure 22:
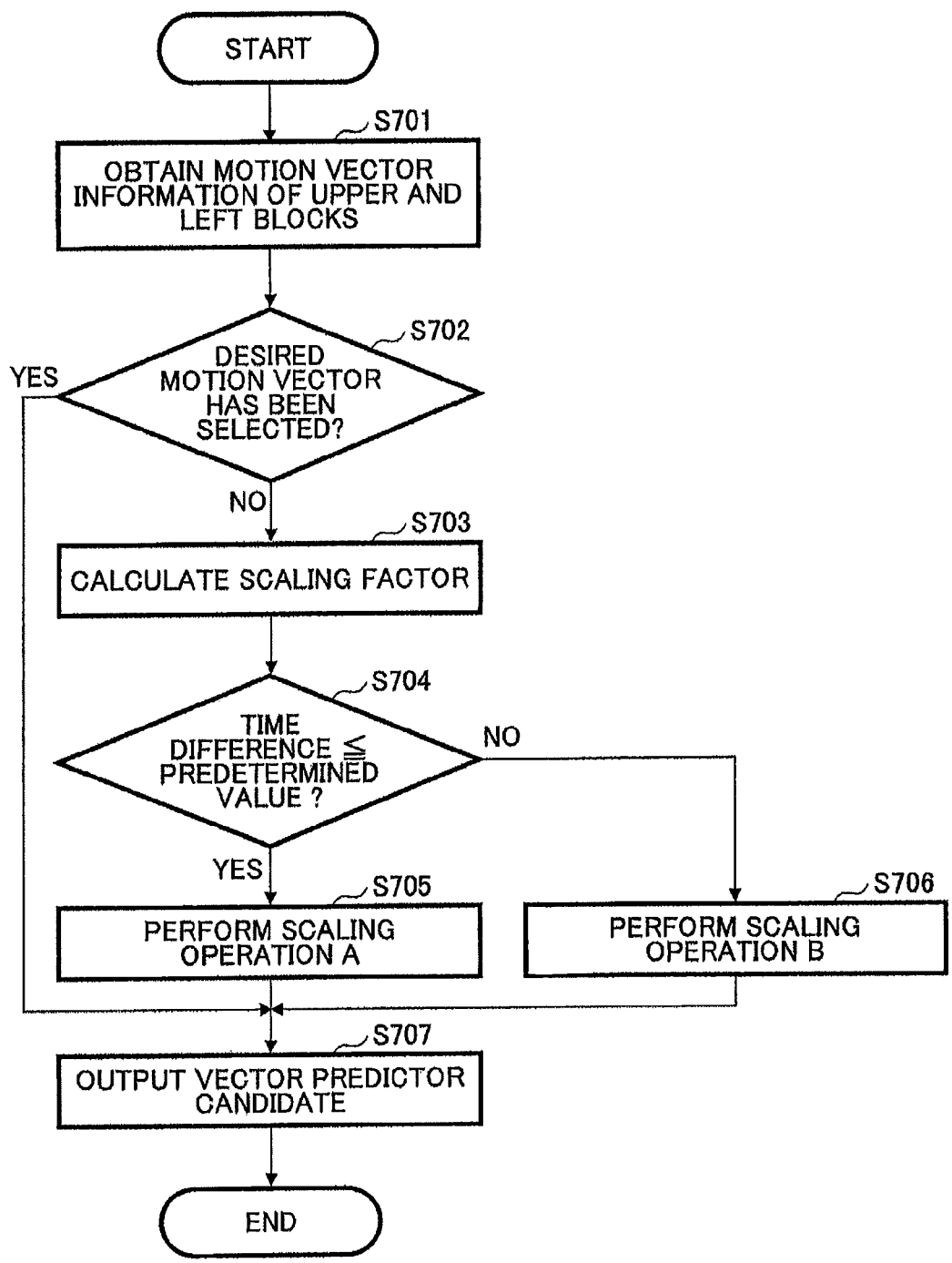
FIG. 22 is a flowchart illustrating an exemplary process (1) performed by a vector predictor generating unit of the fourth embodiment.

FIG. 22 is a flowchart illustrating an exemplary process (1) performed by the vector predictor generating unit 600 of the fourth embodiment. Steps S701 through S703 of FIG. 22 are substantially the same as steps S201 through S203 of FIG. 14.

In step S704, the time difference determining unit 601 calculates the time difference between the display time of a picture including a pre-scaling motion vector (vector predictor candidate) and the display time of a picture that the pre-scaling motion vector refers to, and determines whether the time difference is less than or equal to the predetermined value. If the time difference is less than or equal to the predetermined value (YES in step S704), the process proceeds to step S705. Meanwhile, if the time difference is greater than the predetermined value (NO in step S704), the process proceeds to step S706.

In step S705, the scaling operation unit A602 performs a scaling operation using formulas (15) and (16) where a scaled vector predictor candidate is corrected by the predetermined amount "a".

In step S706, the scaling operation unit B603 performs a scaling operation using formulas (12) and (13).

In step S707, the vector predictor generating unit 600 outputs the motion vector calculated by the scaling operation unit A602 or B603 as a vector predictor candidate. Meanwhile, when a desired motion vector has been selected, the vector predictor generating unit 600 outputs the desired motion vector as a vector predictor candidate without performing the scaling operation.

<Vector Predictor Candidates of Temporally-Adjacent Blocks>

Figure 23:
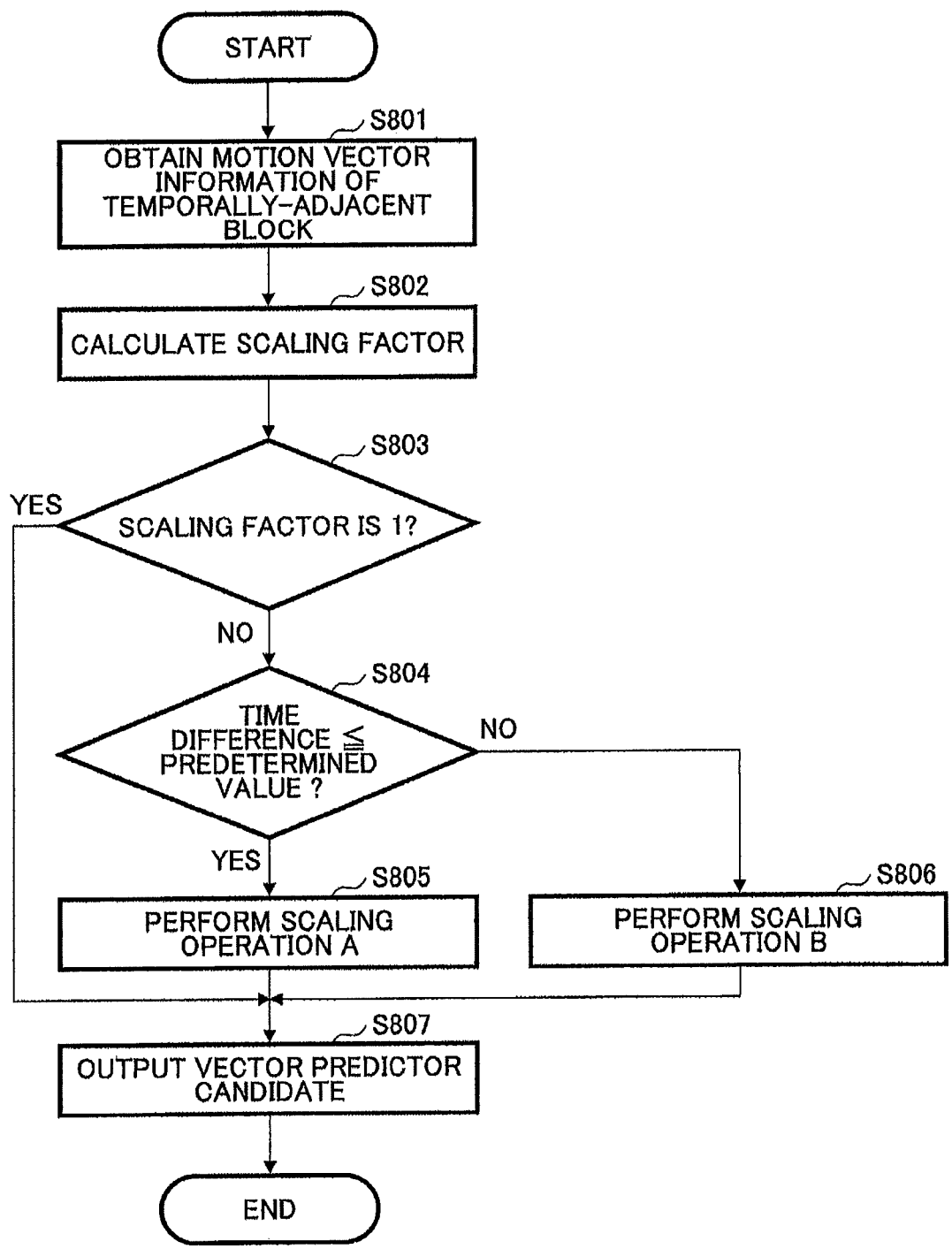
FIG. 23 is a flowchart illustrating an exemplary process (2) performed by a vector predictor generating unit of the fourth embodiment.

FIG. 23 is a flowchart illustrating an exemplary process (2) performed by the vector predictor generating unit 600 of the fourth embodiment.

Steps S801 through S803 of FIG. 23 are substantially the same as steps S301 through S303 of FIG. 15.

In step S804, the time difference determining unit 601 calculates the time difference between the display time of a picture including a pre-scaling motion vector (vector predictor candidate) and the display time of a picture that the pre-scaling motion vector refers to, and determines whether the time difference is less than or equal to the predetermined value. If the time difference is less than or equal to the predetermined value (YES in step S804), the process proceeds to step S805. Meanwhile, if the time difference is greater than the predetermined value (NO in step S804), the process proceeds to step S806.

In step S805, the scaling operation unit A602 performs a scaling operation using formulas (15) and (16) where a scaled vector predictor candidate is corrected by the predetermined amount "a".

In step S806, the scaling operation unit B603 performs a scaling operation using formulas (12) and (13).

In step S807, the vector predictor generating unit 600 outputs the motion vector calculated by the scaling operation unit A602 or B603 as a vector predictor candidate. Meanwhile, when the scaling factor is 1, the vector predictor generating unit 600 outputs the motion vector as a vector predictor candidate without performing the scaling operation.

Thus, the fourth embodiment makes it possible to adaptively switch scaling operations based on the difference between the display time of a picture including a pre-scaling motion vector (vector predictor candidate) and the display time of a picture that the pre-scaling motion vector refers to, and thereby makes it possible to improve the accuracy of a vector predictor.

<<Fifth Embodiment<<

Next, a video coding apparatus 700 according to a fifth embodiment is described. The video coding apparatus 700 of the fifth embodiment may include a vector predictor generating unit of any one of the first through fourth embodiments.

<Configuration>

Figure 24:
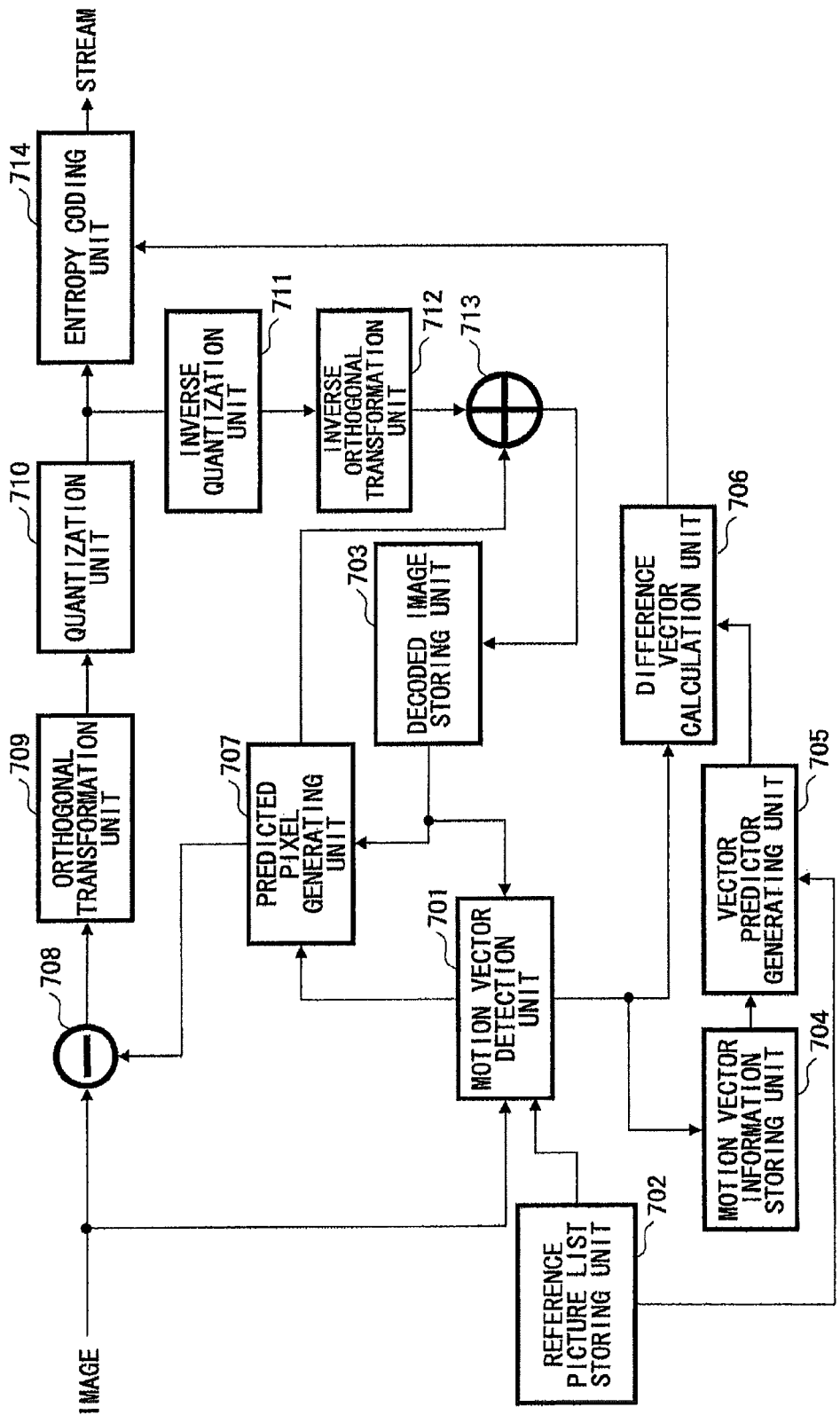
FIG. 24 is a block diagram illustrating an exemplary configuration of a video coding apparatus according to a fifth embodiment.

FIG. 24 is a block diagram illustrating an exemplary configuration of the video coding apparatus 700 according to the fifth embodiment. As illustrated in FIG. 24, the video coding apparatus 700 may include a motion vector detection unit 701, a reference picture list storing unit 702, a decoded image storing unit 703, a motion vector information storing unit 704, a vector predictor generating unit 705, and a difference vector calculation unit 706.

The video coding apparatus 700 may also include a predicted pixel generating unit 707, a prediction error generating unit 708, an orthogonal transformation unit 709, a quantization unit 710, an inverse quantization unit 711, an inverse orthogonal transformation unit 712, a decoded pixel generating unit 713, and an entropy coding unit 714.

The motion vector detection unit 701 obtains an original image, obtains the storage location of a reference picture from the reference picture list storing unit 702, and obtains pixel data of the reference picture from the decoded image storing unit 703. The motion vector detection unit 701 detects reference indexes and motion vectors of L0 and L1. Then, the motion vector detection unit 701 outputs region location information of reference pictures that the detected motion vectors refer to, to the predicted pixel generating unit 707.

The reference picture list storing unit 702 stores picture information including storage locations of reference pictures and POCs of reference pictures that a target block can refer to.

The decoded image storing unit 703 stores pictures that have been previously encoded and locally decoded in the video coding apparatus 700 as reference pictures used for motion compensation.

The motion vector information storing unit 704 stores motion vector information including reference indexes of L0 and L1 and motion vectors detected by the motion vector detection unit 701. For example, the motion vector storing unit 704 stores motion vector information including motion vectors of blocks that are temporally and spatially adjacent to a target block and reference picture identifiers indicating pictures that the motion vectors refer to.

The vector predictor generating unit 705 generates vector predictor candidate lists for L0 and L1. Vector predictor candidates may be generated as described in the first through fourth embodiments.

The difference vector calculation unit 706 obtains the motion vectors of L0 and L1 from the motion vector detection unit 701, obtains the vector predictor candidate lists of L0 and L1 from the vector predictor generating unit 705, and calculates difference vectors.

For example, the difference vector calculation unit 706 selects vector predictors that are closest to the motion vectors of L0 and L1 (L0 and L1 motion vectors) from the vector predictor candidate lists, and thereby determines vector predictors (L0 and L1 vector predictors) and predictor candidate indexes for L0 and L1.

Then, the difference vector calculation unit 706 subtracts the L0 vector predictor from the L0 motion vector to generate an L0 difference vector, and subtracts the L1 vector predictor from the L1 motion vector to generate an L1 difference vector.

The predicted pixel generating unit 707 obtains reference pixels from the decoded image storing unit 703 based on the region location information of reference pictures input from the motion vector detection unit 701, and generates a predicted pixel signal.

The prediction error generating unit 708 obtains the original image and the predicted pixel signal, and calculates a difference between the original image and the predicted pixel signal to generate a prediction error signal.

The orthogonal transformation unit 709 performs orthogonal transformation such as discrete cosine transformation on the prediction error signal, and outputs an orthogonal transformation coefficient to the quantization unit 710. The quantization unit 710 quantizes the orthogonal transformation coefficient.

The inverse quantization unit 711 performs inverse quantization on the quantized orthogonal transformation coefficient. The inverse orthogonal transformation unit 712 performs inverse orthogonal transformation on the inversely-quantized coefficient.

The decoded pixel generating unit 713 adds the prediction error signal and the predicted pixel signal to generate decoded pixels. A decoded image including the generated decoded pixels is stored in the decoded image storing unit 703.

The entropy coding unit 714 performs entropy coding on the reference indexes, the difference vectors, and the predictor candidate indexes of L0 and L1 and the quantized orthogonal transformation coefficient obtained from the difference vector calculation unit 706 and the quantization unit 710. Then, the entropy coding unit 714 outputs the entropy-coded data as a stream.

<Operations>

Figure 25:
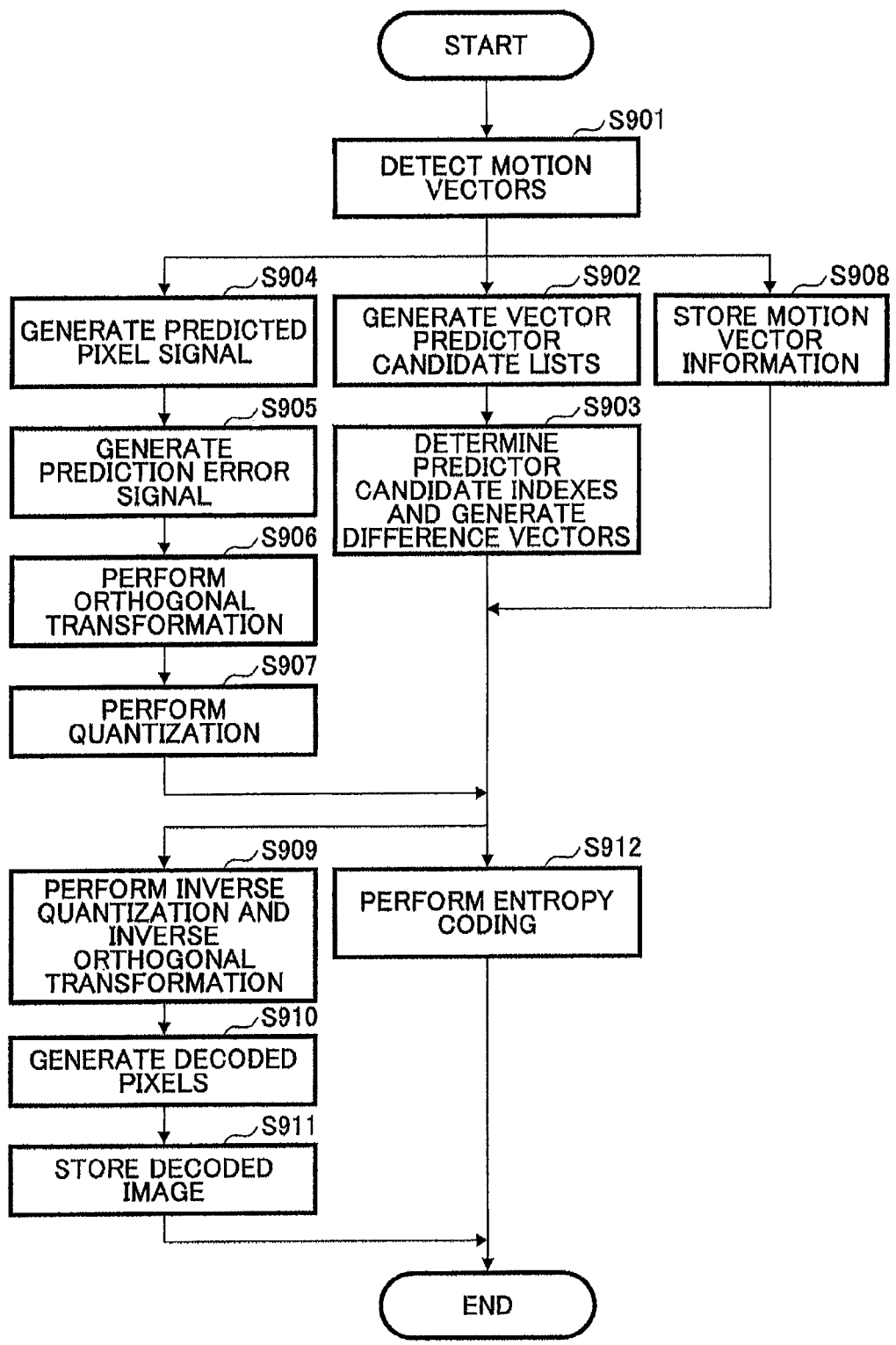
FIG. 25 is a flowchart illustrating an exemplary process performed by a video coding apparatus of the fifth embodiment.

Next, exemplary operations of the video coding apparatus 700 of the fifth embodiment are described. FIG. 25 is a flowchart illustrating an exemplary process performed by the video coding apparatus 700. In the process of FIG. 25, one block, which is a unit of processing, is encoded.

In step S901, the motion vector detection unit 701 obtains an original image and pixel data of a reference picture, and detects reference indexes and motion vectors of L0 and L1.

In step S902, the vector predictor generating unit 705 generates vector predictor candidate lists for L0 and L1. In this step, the vector predictor generating unit 705 corrects scaled vector predictor candidates toward the 0 vector by the predetermined amount "a".

In step S903, the difference vector calculation unit 706 selects vector predictors that are closest to the motion vectors of L0 and L1 (L0 and L1 motion vectors) from the vector predictor candidate lists, and thereby determines vector predictors (L0 and L1 vector predictors) and predictor candidate indexes for L0 and L1.

Then, the difference vector calculation unit 706 subtracts the L0 vector predictor from the L0 motion vector to generate an L0 difference vector, and subtracts the L1 vector predictor from the L1 motion vector to generate an L1 difference vector.

In step S904, the predicted pixel generating unit 707 obtains reference pixels from the decoded image storing unit 703 based on the region location information of reference pictures input form the motion vector detection unit 701, and generates a predicted pixel signal.

In step S905, the prediction error generating unit 708 receives the original image and the predicted pixel signal, and calculates a difference between the original image and the predicted pixel signal to generate a prediction error signal.

In step S906, the orthogonal transformation unit 709 performs orthogonal transformation on the prediction error signal to generate an orthogonal transformation coefficient.

In step S907, the quantization unit 710 quantizes the orthogonal transformation coefficient.

In step S908, the motion vector information storing unit 704 stores motion vector information including the reference indexes and the motion vectors of L0 and L1 output from the motion vector detection unit 701. The stored information is used in the subsequent block coding process.

Steps S902 and S903, steps S904 through S907, and step S908 are not necessarily performed in the order described above, and may be performed in parallel.

In step S909, the inverse quantization unit 711 performs inverse quantization on the quantized orthogonal transformation coefficient to generate the orthogonal transformation coefficient. Also in this step, the inverse orthogonal transformation unit 712 generates the prediction error signal by performing inverse orthogonal transformation on the orthogonal transformation coefficient.

In step S910, the decoded pixel generating unit 713 adds the prediction error signal and the predicted pixel signal to generate decoded pixels.

In step S911, the decoded image storing unit 703 stores a decoded image including the decoded pixels.

The decoded image is used in the subsequent block coding process.

In step S912, the entropy coding unit 714 performs entropy coding on the reference indexes, the difference vectors, and the predictor candidate indexes of L0 and L1 and the quantized orthogonal transformation coefficient, and outputs the entropy-coded data as a stream.

Thus, the fifth embodiment makes it possible to improve the accuracy of a vector predictor and to provide a video coding apparatus with improved coding efficiency. A vector predictor generating unit of any one of the first through fourth embodiments may be used for the vector predictor generating unit 705 of the video coding apparatus 700.

Through experiments, the inventors found out that the coding efficiency can be improved by about 1% to 2% by calculating vector predictor candidates using the vector predictor generating units of the above embodiments.

EXAMPLE

Figure 26:
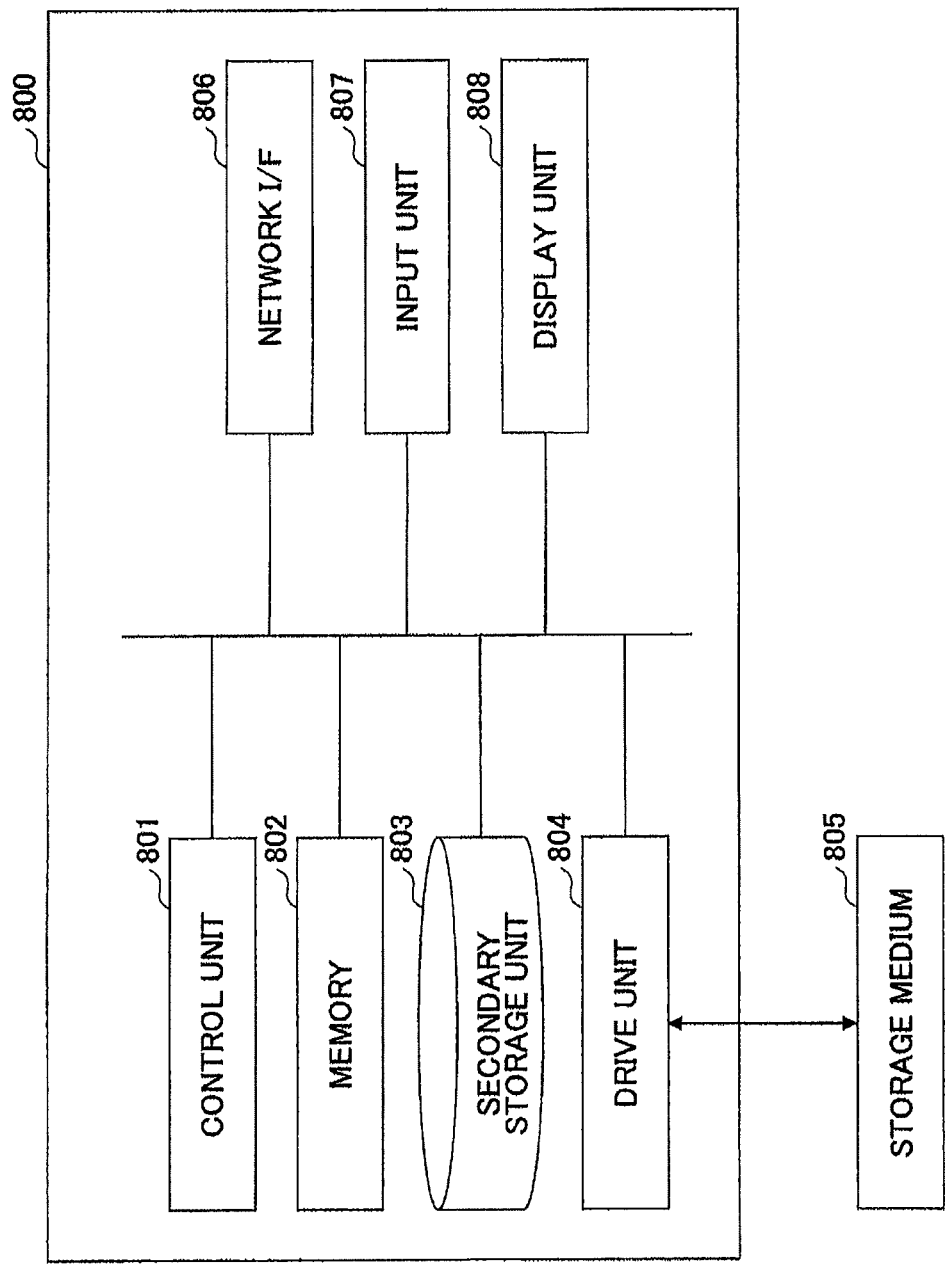
FIG. 26 is a drawing illustrating an exemplary configuration of an image processing apparatus.

FIG. 26 is a drawing illustrating an exemplary configuration of an image processing apparatus 800. The image processing apparatus 800 is an exemplary implementation of a video decoding apparatus or a video coding apparatus of the above embodiments. As illustrated in FIG. 26, the image processing apparatus 800 may include a control unit 801, a memory 802, a secondary storage unit 803, a drive unit 804, a network interface (I/F) 806, an input unit 807, and a display unit 808. These components are connected to each other via a bus to enable transmission and reception of data.

The control unit 801 is a central processing unit (CPU) that controls other components of the image processing apparatus 800 and performs calculations and data processing. For example, the control unit 801 executes programs stored in the memory 802 and the secondary storage unit 803, processes data received from the input unit 807 and the secondary storage unit 803, and outputs the processed data to the display unit 808 and the secondary storage unit 803.

The memory 802 may be implemented, for example, by a read-only memory (ROM) or a random access memory (RAM), and retains or temporarily stores data and programs such as basic software (operating system (OS)) and application software to be executed by the control unit 801.

The secondary storage unit 803 may be implemented by a hard disk drive (HDD), and stores, for example, data related to application software.

The drive unit 804 reads programs from a storage medium 805 and installs the programs in the secondary storage unit 803.

The storage medium 805 stores programs. The programs stored in the storage medium 805 are installed in the image processing apparatus 800 via the drive unit 804. The installed programs can be executed by the image processing apparatus 800.

The network I/F 806 allows the image processing apparatus 800 to communicate with other devices connected via a network, such as a local area network (LAN) or a wide area network (WAN), implemented by wired and/or wireless data communication channels.

The input unit 807 may include a keyboard including cursor keys, numeric keys, and function keys, and a mouse or a trackpad for selecting an item on a screen displayed on the display unit 808. Thus, the input unit 807 is a user interface that allows the user to input, for example, instructions and data to the control unit 801.

The display unit 808 includes, for example, a liquid crystal display (LCD) and displays data received from the control unit 801. The display unit 808 may be provided outside of the image processing apparatus 800. In this case, the image processing apparatus 800 may include a display control unit.

The video coding and decoding methods (or processes) described in the above embodiments may be implemented by programs that are executed by a computer. Such programs may be downloaded from a server and installed in a computer.

Alternatively, programs for implementing the video coding and decoding methods (or processes) described in the above embodiments may be stored in a non-transitory, computer-readable storage medium such as the storage medium 805, and may be read from the storage medium into a computer or a portable device.

For example, storage media such as a compact disk read-only memory (CD-ROM), a flexible disk, and a magneto-optical disk that record information optically, electrically, or magnetically, and semiconductor memories such as a ROM and a flash memory that record information electrically may be used as the storage medium 805. Further, the video coding and decoding methods (or processes) described in the above embodiments may be implemented by one or more integrated circuits.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method performed by a video coding apparatus, the method comprising:

scaling a vector predictor candidate (mvcx, mvcy) of a target block to be encoded to obtain a scaled vector predictor candidate (mvcx', mvcy') based on picture information of pictures and motion vector information including motion vectors (mvCol) of blocks that are spatially or temporally adjacent to the target block and reference picture identifiers indicating pictures that the motion vectors (mvCol) refer to; and correcting the scaled vector predictor candidate toward 0 by a predetermined amount "a", wherein when a predetermined precision N after a decimal point of a scaling factor (Scale) is 8 bits, the scaling and the correcting are represented by formulas:

$$mvcx'=\text{sign}(\text{Scale}\times mvcx)\times\{(\text{abs}(\text{Scale}\times mvcx)-a+128)>>8\}$$

$$mvcy'=\text{sign}(\text{Scale}\times mvcy)\times\{(\text{abs}(\text{Scale}\times mvcy)-a+128)>>8\}$$

abs( ): a function that returns an absolute value sign( ): a function that returns a sign(1 or −1); and wherein the predetermined amount "a" is greater than or equal to 1 and less than or equal to $2^{N-2}$.

* * * * *